(12) United States Patent
Beasley

(10) Patent No.: US 12,140,166 B2
(45) Date of Patent: Nov. 12, 2024

(54) DIVERTER TEST CELL WITH REPLACEABLE INSERT

(71) Applicant: Chevron U.S.A. Inc., San Ramon, CA (US)

(72) Inventor: David Cutler Beasley, Pittsburgh, PA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 693 days.

(21) Appl. No.: 17/465,185

(22) Filed: Sep. 2, 2021

(65) Prior Publication Data

US 2022/0074438 A1 Mar. 10, 2022

Related U.S. Application Data

(60) Provisional application No. 63/074,743, filed on Sep. 4, 2020.

(51) Int. Cl.
| | |
|---|---|
| F15D 1/02 | (2006.01) |
| F15D 1/00 | (2006.01) |
| G01F 25/10 | (2022.01) |
| E21B 43/26 | (2006.01) |

(52) U.S. Cl.
CPC ............... *F15D 1/02* (2013.01); *F15D 1/001* (2013.01); *G01F 25/10* (2022.01); *E21B 43/26* (2013.01)

(58) Field of Classification Search
CPC . F15D 1/02; F15D 1/001; G01F 25/10; E21B 43/26
USPC .... 137/487.5, 834, 836, 296, 546, 590, 602; 137/550; 29/890.1, 890.124; 73/864.83; 422/407, 417, 93, 503, 551, 554, 602; 210/95, 282, 288, 446
See application file for complete search history.

(56) References Cited

U.S. PATENT DOCUMENTS

| | | | | |
|---|---|---|---|---|
| 5,478,526 | A * | 12/1995 | Sakai ................. | G01N 35/1016 422/68.1 |
| 6,102,073 | A * | 8/2000 | Williams ................ | A61M 1/84 137/561 R |
| 6,833,111 | B2 * | 12/2004 | Robertson ........ | G01N 33/54386 422/417 |
| 7,112,444 | B2 * | 9/2006 | Beebe ................ | G01N 33/6818 422/417 |
| 7,300,627 | B1 * | 11/2007 | Sun ..................... | A61B 10/0045 422/417 |
| 8,133,454 | B2 * | 3/2012 | Tajima .................. | B01L 3/0275 422/50 |

(Continued)

*Primary Examiner* — Minh Q Le
(74) *Attorney, Agent, or Firm* — Smith & Woldesenbet Law Group, PLLC

(57) ABSTRACT

A diverter test cell can include an enclosure having a body and a cover removably coupled to the body, where the body forms a cavity that is enclosed by the cover, where the body includes an inlet port and an outlet port in communication with the cavity. The diverter test cell can also include an insert removably disposed within the cavity, where the insert has a channel that forms continuously from a first end to a second end of the insert, where the channel has first width at the first end and a second width at the second end, where the first width is less than the second width, where the first end of the insert is adjacent to the inlet port of the enclosure, and where the second end of the insert is adjacent to the outlet port of the enclosure.

20 Claims, 16 Drawing Sheets

(56) References Cited

U.S. PATENT DOCUMENTS

| | | | | |
|---|---|---|---|---|
| 8,263,024 B2* | 9/2012 | Wan | ................ | B01L 3/502746 |
| | | | | 422/68.1 |
| 8,617,265 B2* | 12/2013 | Chellappa | ............... | C01B 3/384 |
| | | | | 422/600 |
| 8,807,163 B2* | 8/2014 | Bell | ........................ | B29C 48/92 |
| | | | | 264/237 |
| 8,900,533 B2* | 12/2014 | Cohen | .................... | B01L 9/543 |
| | | | | 422/550 |
| 9,021,700 B2* | 5/2015 | Koseki | .................. | B41J 2/1642 |
| | | | | 29/890.1 |
| 2002/0172621 A1* | 11/2002 | Barbera-Guillem | ........................ | |
| | | | | B01L 3/50853 |
| | | | | 422/503 |
| 2009/0269139 A1* | 10/2009 | McBride | .................. | F15D 1/02 |
| | | | | 405/80 |
| 2012/0138176 A1* | 6/2012 | Noishiki | ................ | B01F 33/30 |
| | | | | 137/602 |
| 2012/0168015 A1* | 7/2012 | Schultz | .................. | E21B 47/24 |
| | | | | 137/826 |
| 2015/0165469 A1* | 6/2015 | Cobb | .................. | B29C 48/307 |
| | | | | 118/313 |
| 2019/0101230 A1* | 4/2019 | Dalmas, II | ............ | F02B 75/282 |
| 2021/0025743 A1* | 1/2021 | Welsch | ................ | G01N 29/222 |
| 2022/0082116 A1* | 3/2022 | Schmidt | .................. | F15D 1/065 |

* cited by examiner

DIVERTER TEST CELL WITH REPLACEABLE INSERT

CROSS-REFERENCE TO RELATED APPLICATIONS

This application claims priority under 35 U.S.C. § 119 to U.S. Provisional Patent Application Ser. No. 63/074,743 titled "Diverter Test Cell With Replaceable Insert" and filed on Sep. 4, 2020, the entire contents of which are hereby incorporated herein by reference.

TECHNICAL FIELD

The present application is related to testing using diverter products and, more particularly, to diverter test cells with replaceable inserts.

BACKGROUND

Existing test methods for diverter products generally rely on slot models that narrow without accounting for changes in fluid flow area. This can create unrealistic flow conditions and may not allow for observation of gravity effects. Large scale flow models generally cannot handle pressures or temperatures above atmospheric conditions, and thus are limited in measuring effectiveness of diverter materials in simulated conditions, such as downhole conditions when simulating subterranean formations in oil and gas field operations.

SUMMARY

In general, in one aspect, the disclosure relates to a diverter test cell that includes an enclosure having a body and a cover removably coupled to the body, where the body forms a cavity that is enclosed by the cover when the cover is coupled to the body, where the body comprises an inlet port and an outlet port in communication with the cavity, and where the inlet port and the outlet port are disposed on opposite sides of the body. The diverter test cell can also include an insert removably disposed within the cavity, where the insert has a channel that forms continuously from a first end to a second end of the insert, where the channel has a first height and a first width at the first end and a second height and a second width at the second end, where the first width is less than the second width, where the first end of the insert is adjacent to the inlet port of the enclosure, and where the second end of the insert is adjacent to the outlet port of the enclosure.

In another aspect, the disclosure relates to a system for diverter testing that includes a source apparatus comprising a storage vessel, a pumping system, and an outlet. The system can also include piping coupled to the outlet of the source apparatus. The system can further include a diverter test cell coupled to one of the plurality of pipes. The diverter test cell of the system can include an enclosure that includes a body and a cover removably coupled to the body, where the body forms a cavity that is enclosed by the cover when the cover is coupled to the body, where the body comprises an inlet port and an outlet port in communication with the cavity, where the inlet port and the outlet port are disposed on opposite sides of the body, and where the inlet port is coupled to the piping. The diverter test cell of the system can also include an insert movably disposed within the cavity, where the insert has a channel that forms continuously from a first end to a second end of the insert, where the channel has a first height and a first width at the first end and a second height and a second width at the second end, where the first height is greater than the second height, where the first end of the insert is adjacent to the inlet port of the enclosure, and where the second end of the insert is adjacent to the outlet port of the enclosure. The pumping system can be configured to force a fluid to flow from the storage vessel, through the outlet, through the piping, through the inlet port, through the channel, and through the outlet port, where the fluid flows at a substantially constant flow rate through the channel of the insert.

In yet another aspect, the disclosure relates to an insert for a diverter test cell. The insert can include a body having a first end and a second end. The insert can also include a channel continuously disposed within the body from the first end to the second end, where the channel has a height and a width that varies between the first end and the second end, where the width and the height forms a cross-sectional area that is substantially constant between the first end and the second end, where the first end is configured to be disposed adjacent to an inlet port of the enclosure of the diverter test cell, where the second end is configured to be disposed adjacent to an outlet port of the enclosure of the diverter test cell, and where the channel is configured to receive fluid that flows from the first end to the second end.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
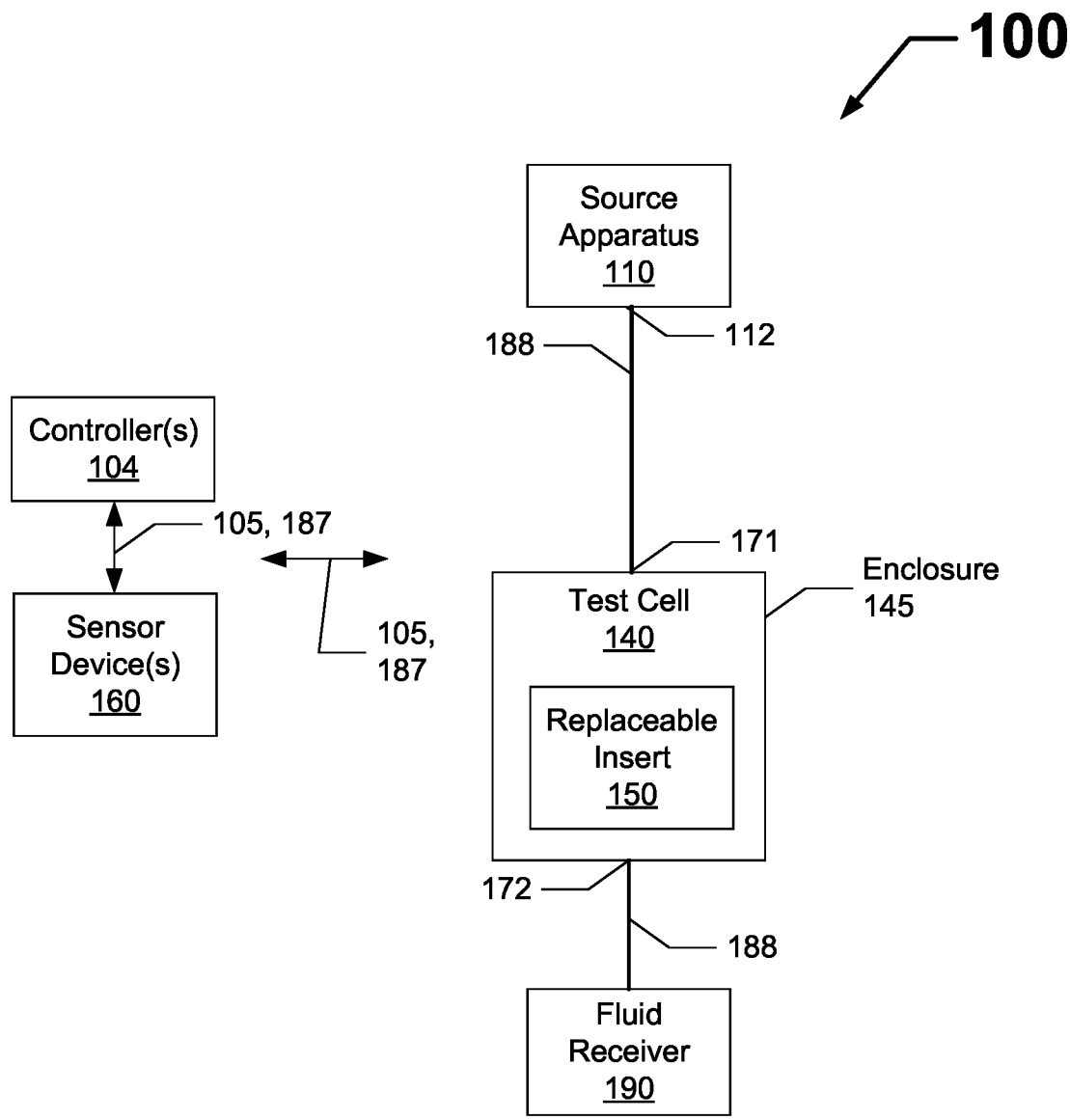
FIG. 1 shows a testing system that includes a diverter test cell according to certain example embodiments.

The example embodiments discussed herein are directed to systems, apparatus, methods, and devices for diverter test cells with replaceable inserts. Example embodiments can be used to test any of a number of environments, including but not limited to subterranean field operations (e.g., fracture operations, shelf valve simulation, downhole screening) and chemical processes. Examples of fluids that can be used during tests involving diverter test cells can include, but are not limited to, water, mud, and chemicals.

An example diverter test cell includes multiple components that are described herein, where a component (e.g., an insert) can be made from a single piece (as from a mold or an extrusion or a three-dimensional printing process). When a component (or portion thereof) of an example diverter test cell is made from a single piece, the single piece can be cut out, bent, stamped, and/or otherwise shaped to create certain features, elements, or other portions of the component. Alternatively, a component (or portion thereof) of an example diverter test cell can be made from multiple pieces that are mechanically coupled to each other. In such a case, the multiple pieces can be mechanically coupled to each other using one or more of a number of coupling methods, including but not limited to adhesives, welding, stitching, zippers, fastening devices, compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example diverter test cell) can be made of one or more of a number of suitable materials, including but not limited to metal (e.g., stainless steel), ceramic, rubber, glass, fibrous material, and plastic.

A coupling feature (including a complementary coupling feature) as described herein can allow one or more components (e.g., a housing) and/or portions of an example diverter test cell to become mechanically coupled, directly or indirectly, to another portion of the diverter test cell and/or a component of a testing system. A coupling feature can include, but is not limited to, a portion of a hinge, an aperture, a recessed area, a protrusion, a slot, a spring clip, a tab, a detent, and mating threads. One portion of an example diverter test cell can be coupled to another portion of the diverter test cell and/or a component of a testing system by the direct use of one or more coupling features.

In addition, or in the alternative, a portion of an example diverter test cell can be coupled to another portion of the diverter test cell and/or a component of a testing system using one or more independent devices that interact with one or more coupling features disposed on a component of the diverter test cell. Examples of such devices can include, but are not limited to, a ring, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

Testing systems that use example embodiments can be designed to comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of diverter test cells will be described more fully hereinafter with reference to the accompanying drawings, in which example embodiments of diverter test cells are shown. Diverter test cells may, however, be embodied in many different forms and should not be construed as limited to the example embodiments set forth herein. Rather, these example embodiments are provided so that this disclosure will be thorough and complete, and will fully convey the scope of diverter test cells to those of ordinary skill in the art. Like, but not necessarily the same, elements (also sometimes called components) in the various figures are denoted by like reference numerals for consistency.

Terms such as "first", "second", "outer", "inner", "top", "bottom", "above", "below", "distal", "proximal", "front,", "rear," "left," "right," "on", and "within" are used merely to distinguish one component (or part of a component or state of a component) from another. This list of terms is not exclusive. Such terms are not meant to denote a preference or a particular orientation, and they are not meant to limit embodiments of diverter test cells. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a testing system 100 that includes a diverter test cell 140 according to certain example embodiments. The testing system 100 includes multiple components. In this case, in addition to the example diverter test cell 140 (also more simply called a test cell 140 herein), the testing system 100 includes a source apparatus 110, a fluid receiver 190, one or more sensor devices 160, and a controller 104. The diverter test cell 140 can include one or more replaceable insert 150.

The components shown in FIG. 1 are not exhaustive, and in some embodiments, one or more of the components shown in FIG. 1 may not be included in the example testing system 100. Any component of the testing system 100 can be discrete or combined with one or more other components of the testing system 100. Also, one or more components of the testing system 100 can have different configurations. For example, one or more sensor devices 160 can be disposed within or disposed on other components (e.g., the replaceable insert 150, the piping 188, the enclosure 145 of the diverter test cell 140). As another example, the controller 104, rather than being a stand-alone device, can be part of another component (e.g., the source apparatus 110, the diverter test cell 140) of the testing system 100.

The source apparatus 110 of the testing system 100 can be configured to facilitate the testing of a fluid and can include one or more components. Alternatively, the source apparatus 110 can merely be configured to perform the storage and any mixing of the fluids that might be required for testing, while another component (e.g., the fluid receiver 190) is configured to facilitate the movement and other manipulation of the fluid during testing. Examples of components of the source apparatus 110 can include, but are not limited to, one or more fluid storage vessels, a mixer, a fluid transmission system (e.g., a pump, a valve, a compressor, piping (e.g., piping 188)), a heater, one or more sensor devices (e.g., sensor devices 160), and a controller (e.g., controller 104). The source apparatus 110 can control one or more characteristics (e.g., temperature, flow rate, pressure) of the fluid that is delivered to the diverter test cell 140. In some cases, these characteristics are designed to replicate conditions in a subterranean wellbore and/or formation.

The fluid can have any of a number of different compositions that are naturally occurring or man-made. The fluid can be or include a solid, a liquid, and/or a gas. In some cases, the fluid used in the testing system 100 is configured to mimic a fluid that is used in subterranean field operations. Examples of such a fluid can include, but are not limited to, a fracturing fluid (e.g., a fluid that includes one or more proppants), a drilling mud, and a chemical cleaner. The source apparatus 110 sends the fluid out of the outlet 112 to the diverter test cell 140 through piping 188.

The piping 188 can include multiple pipes, elbows, joints, sleeves, collars, and similar components that are coupled to each other (e.g., using coupling features such as mating threads) to establish a network for transferring the fluid. Each component of the piping 188 can have an appropriate size (e.g., inner diameter, outer diameter) and be made of an appropriate material (e.g., stainless steel) to safely handle the pressure, temperature, flow rate, and other characteristics of the fluid.

The testing system 100 can include one or more controllers 104. A controller 104 of the testing system 100 communicates with and in some cases controls one or more of the other components (e.g., a sensor device 160, some or all of the source apparatus 110) of the testing system 100. The controller 104 performs a number of functions that include receiving and sending data, evaluating data, following protocols, running algorithms, and sending commands. The controller 104 can include one or more of a number of components. Such components of the controller 104 can include, but are not limited to, a control engine, a communication module, a timer, a counter, a power module, a storage repository, a hardware processor, memory, a transceiver, an application interface, and a security module. When there are multiple controllers 104 (e.g., one controller for the source apparatus 110, another controller for a sensor device 160), each controller 104 can operate independently of each other. Alternatively, one or more of the controllers 104 can work cooperatively with each other. As yet another alternative, one of the controllers 104 can control some or all of one or more other controllers 104 in the testing system 100.

Each sensor device 160 includes one or more sensors that measure one or more parameters (e.g., pressure, flow rate, temperature, humidity). Examples of a sensor of a sensor device 160 can include, but are not limited to, a temperature sensor, a flow sensor, a pressure sensor, and a camera. A sensor device 160 can be integrated with or measure a parameter associated with one or more components of the testing system 100. For example, sensor device 160 can be configured to measure a parameter (e.g., flow rate, pressure, temperature) of the fluid flowing through the piping 188 at a particular location (e.g., between the source apparatus 110 and the test cell 140). As another example, a sensor device 160 can be configured to determine how open or closed a valve within the source apparatus 110 or other part of the system 100 is. In some cases, a number of sensors and/or sensor devices 160, each measuring a different parameter, can be used in combination to determine and confirm whether a controller 104 should take a particular action (e.g., operate a valve, adjust a temperature, control a pump motor).

Interaction between each controller 104, the sensor devices 160, and other components (e.g., the test cell 140, part of the source apparatus 110) of the testing system 100 can be conducted using communication links 105 and/or power transfer links 187. Each communication link 105 can include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, WirelessHART, ISA100) technology. A communication link 105 can transmit signals (e.g., communication signals, control signals, data) between each controller 104, the sensor devices 160, and other components of the testing system 100.

Each power transfer link 187 can include one or more electrical conductors, which can be individual or part of one or more electrical cables. In some cases, as with inductive power, power can be transferred wirelessly using power transfer links 187. A power transfer link 187 can transmit power between each controller 104, the sensor devices 160, and other components of the testing system 100. Each power transfer link 187 can be sized (e.g., 12 gauge, 18 gauge, 4 gauge) in a manner suitable for the amount (e.g., 480V, 24V, 120V) and type (e.g., alternating current, direct current) of power transferred therethrough.

The test cell 140 includes an enclosure 145 inside of which is disposed the replaceable insert 150. The enclosure 145 is configured to be opened and closed so that the replaceable insert 150 can be inserted within the enclosure before testing and removed from the enclosure after testing. The enclosure 145 of the test cell 140 has in inlet port 171 and an outlet port 172. The piping 188 from the source apparatus 110 is connected to the inlet port 171 of the enclosure 145. Additional piping 188 is disposed between and connected to the outlet port 172 of the enclosure 145 at one end and to the fluid receiver 190 at the other end. More details about the test cell 140, including the enclosure 145 and the removable insert 150, are provided below with respect to FIGS. 2A through 5C.

The fluid receiver 190 of the testing system 100 is configured to receive the fluid (or what remains of the fluid) after the fluid passes through the removable insert 150 of the test cell 140, while another component (e.g., the source apparatus 110) is configured to facilitate the movement and other manipulation of the fluid during testing. In some alternative cases, the fluid receiver 190 can also be configured to facilitate the testing, movement, and other manipulation of the fluid. The fluid receiver 190 can include one or more components. Examples of such components of the source apparatus 110 can include, but are not limited to, one or more fluid storage vessels, a mixer, a fluid transmission system (e.g., a pump, a valve, a compressor, piping (e.g., piping 188)), a heater, one or more sensor devices (e.g., sensor devices 160), and a controller (e.g., controller 104).

In some cases, the fluid receiver 190 can control one or more characteristics (e.g., temperature, flow rate, pressure) of the fluid that is passed through the diverter test cell 140 to the fluid receiver 190. In such cases, these characteristics are designed to replicate conditions in a subterranean wellbore and/or formation. In addition, or in the alternative, the fluid receiver 190 can be configured to perform an analysis (e.g., chemical composition testing, viscosity measurements) on the fluid (or portions thereof) that reach the fluid receiver 190 after passing through the removable insert 150.

Figure 3A:
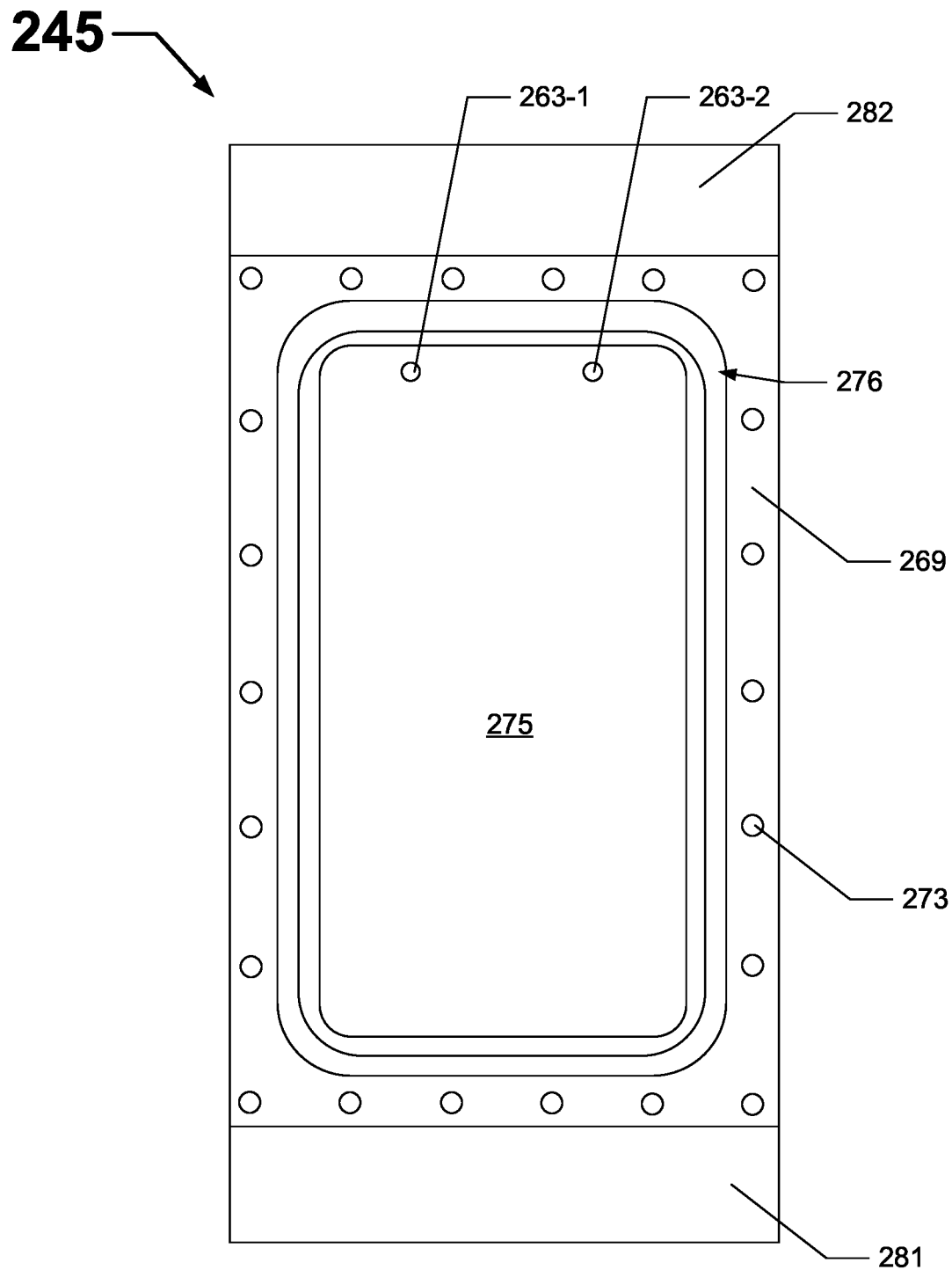
FIGS. 3A through 3C show various view of an enclosure of the diverter test cell of FIGS. 2A through 2D.
Figure 3B:
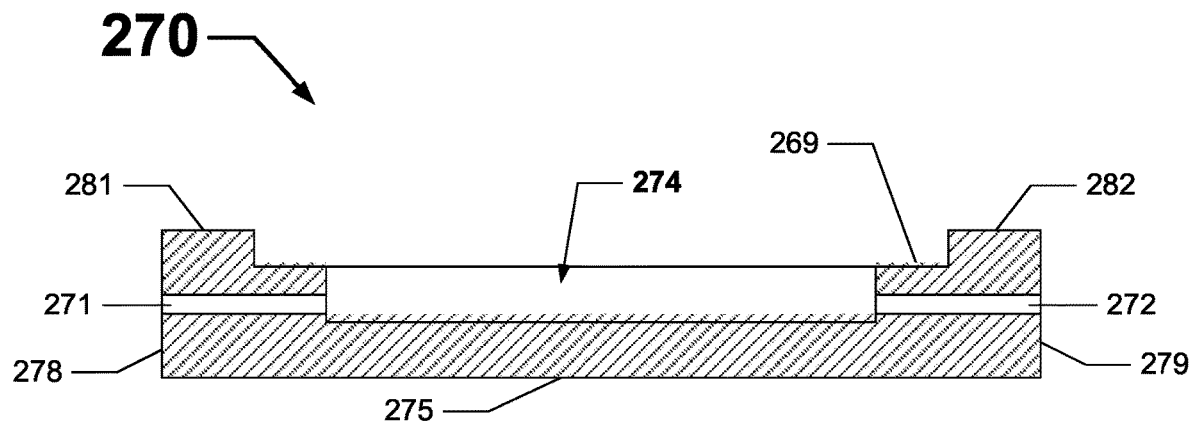
Figure 3C:
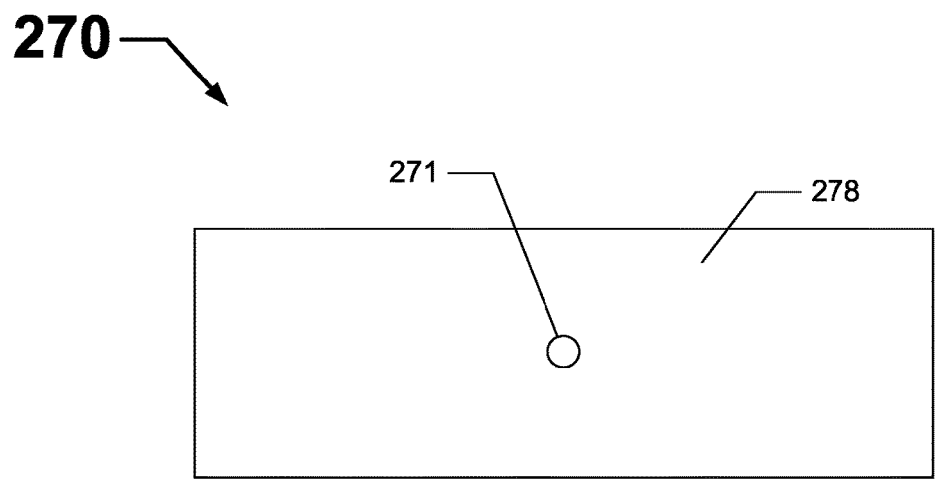
Figure 4A:
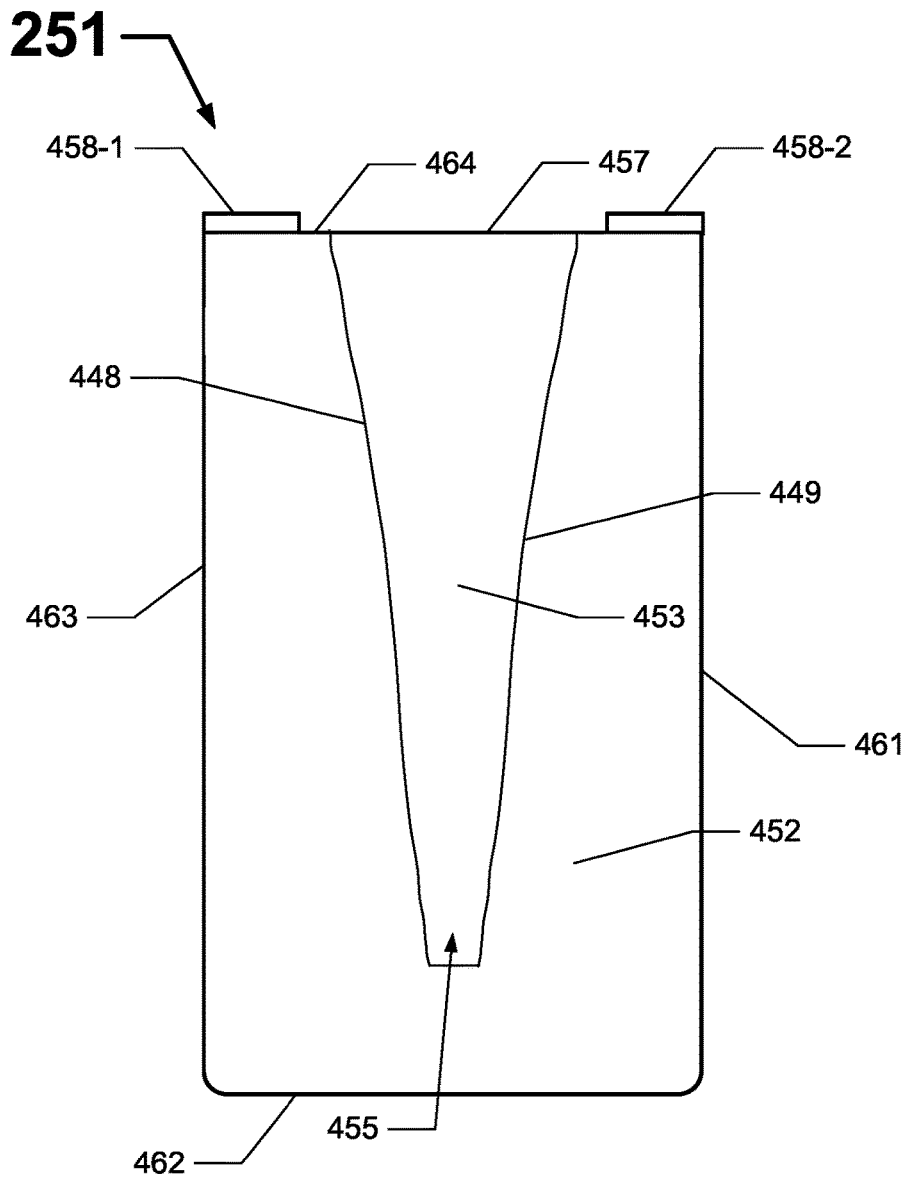
FIGS. 4A through 4E show various view of an insert body of the replaceable insert of the diverter test cell of FIGS. 2A through 2D.
Figure 4B:
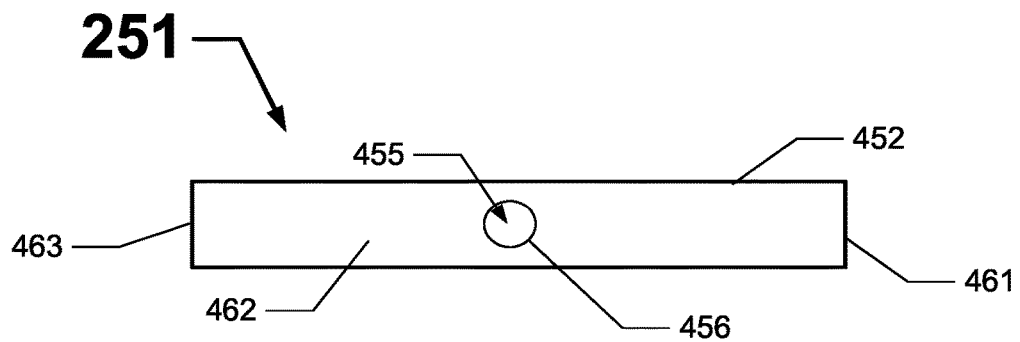
Figure 4C:
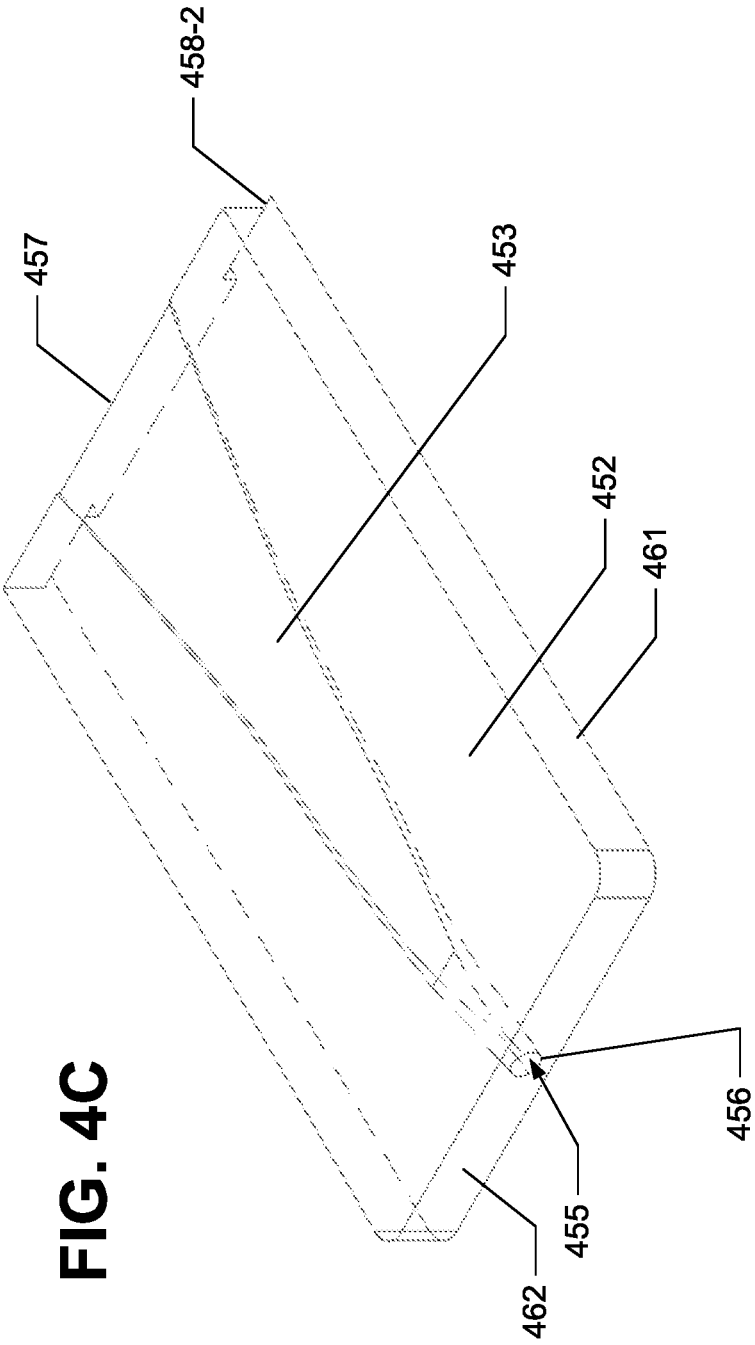
Figure 4D:
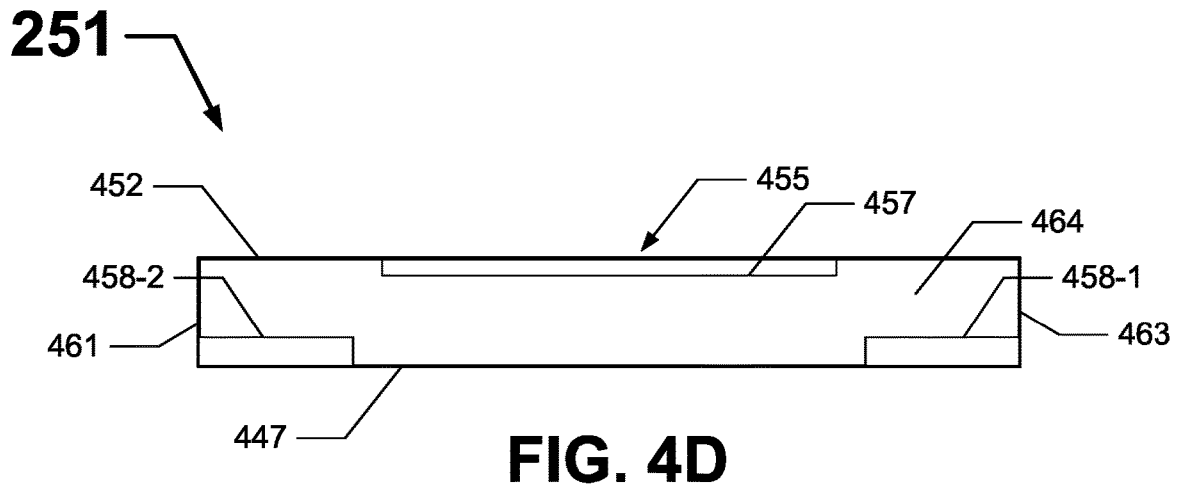
Figure 4E:
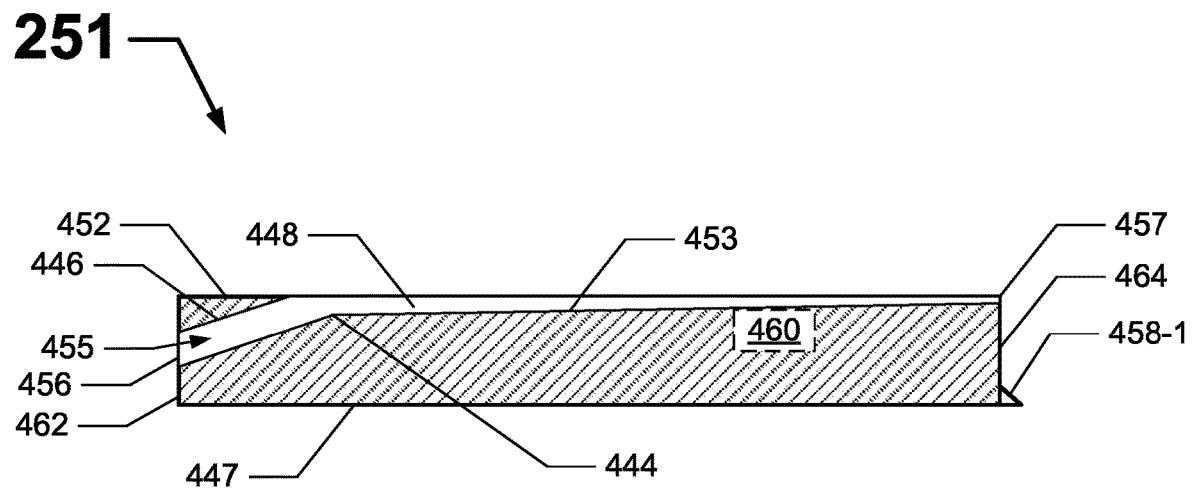
Figure 5A:
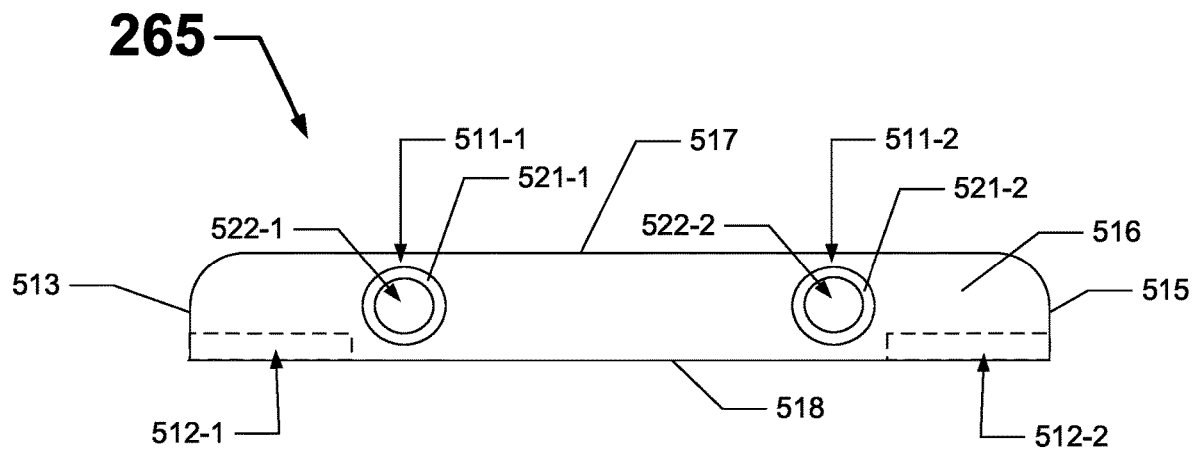
FIGS. 5A through 5C show various view of an adapter of the replaceable insert of the diverter test cell of FIGS. 2A through 2D.
Figure 5B:
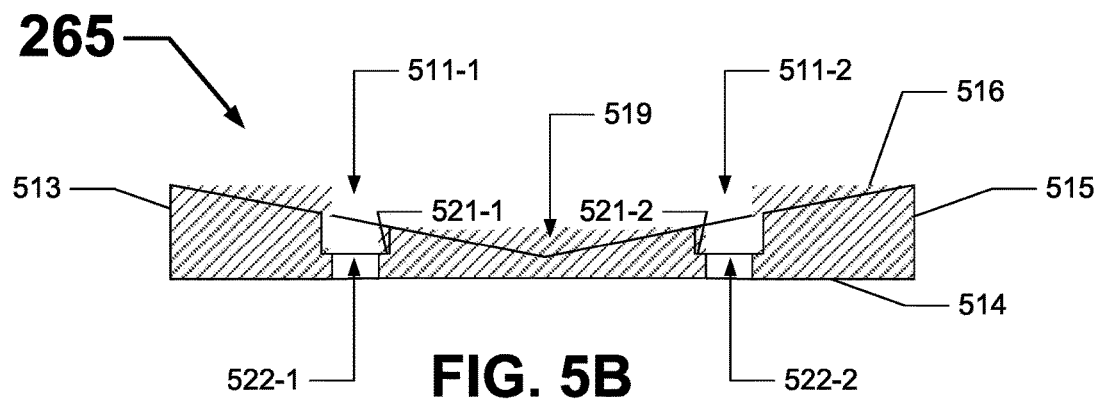
Figure 5C:
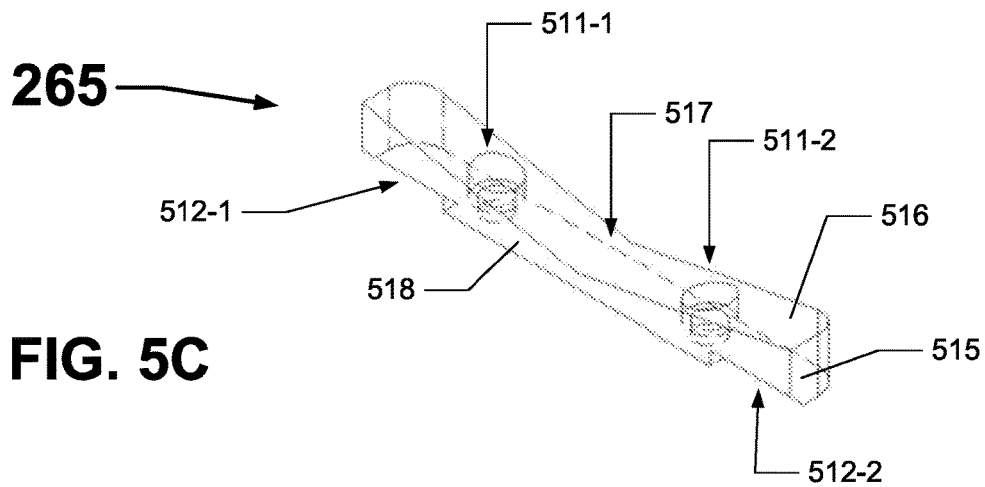

FIGS. 2A through 2D show various views of a diverter test cell 240 according to certain example embodiments. FIGS. 3A through 3C show various views of the enclosure 245 of the diverter test cell 240 of FIGS. 2A through 2D. FIGS. 4A through 4E show various views of an insert body 251 of the replaceable insert 250 of the diverter test cell 240 of FIGS. 2A through 2D. FIGS. 5A through 5C show various view of an adapter 265 of the replaceable insert 250 of the diverter test cell 240 of FIGS. 2A through 2D.

Figure 2A:
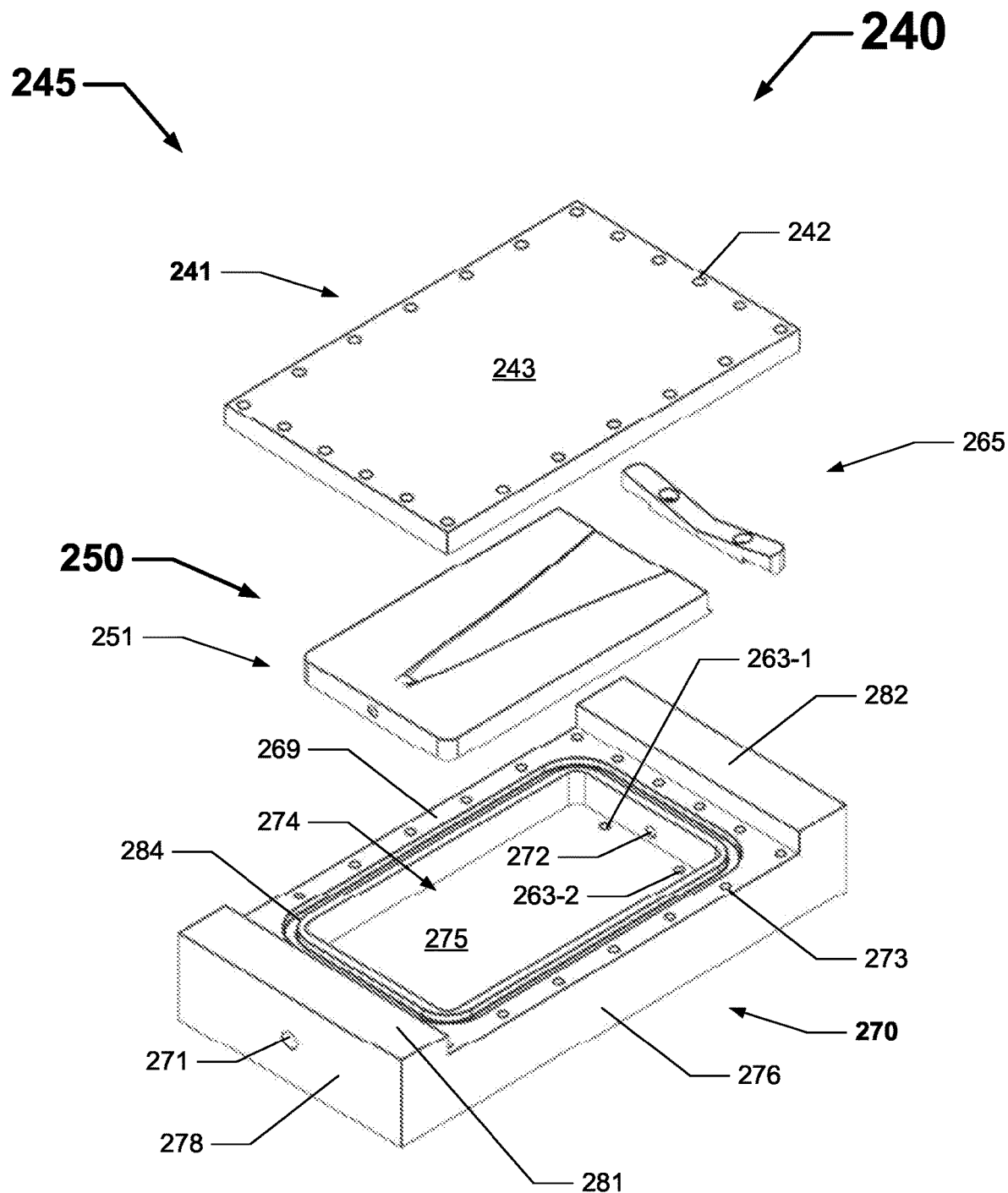
FIGS. 2A through 2D show various views of a diverter test cell according to certain example embodiments.
Figure 2B:
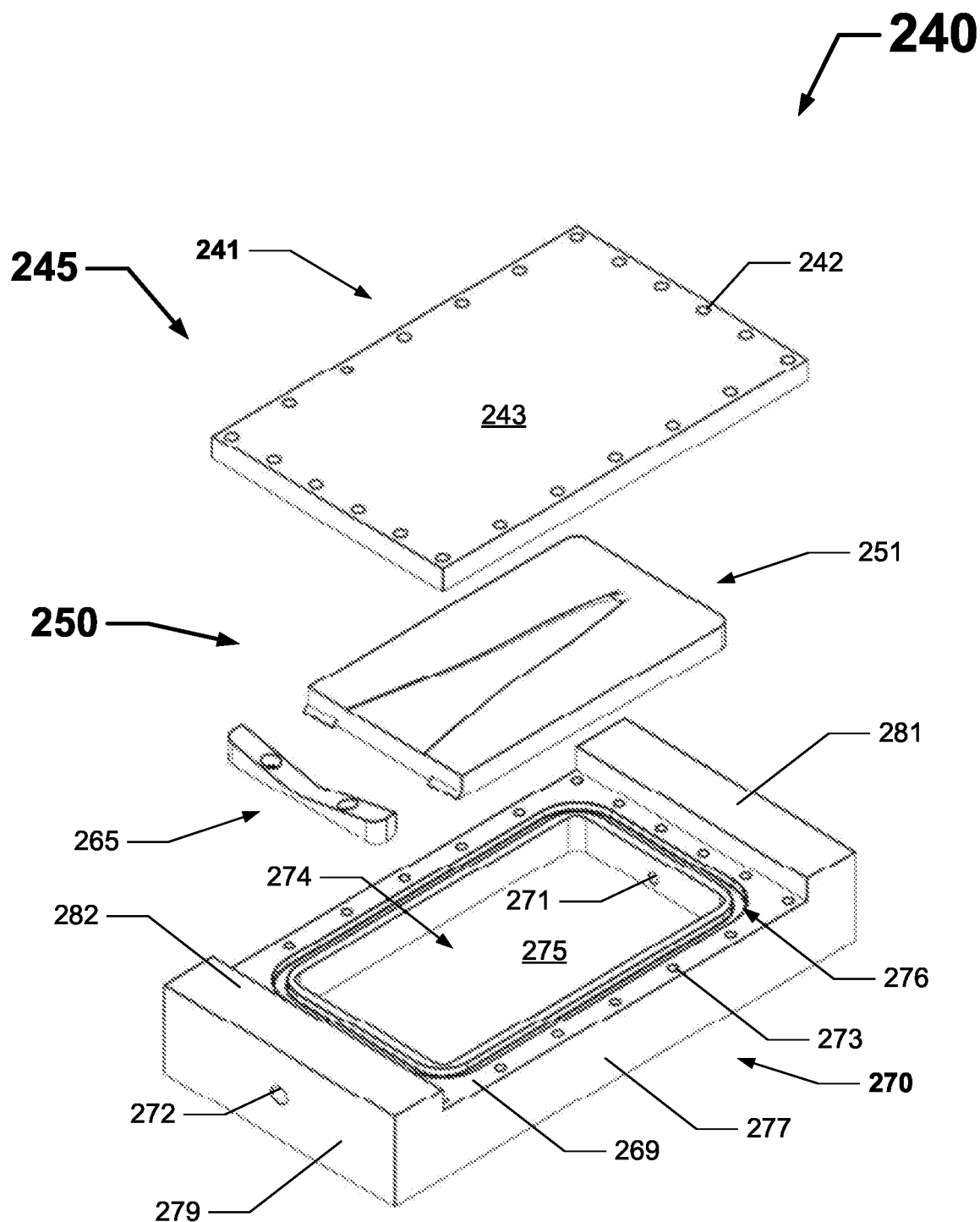
Figure 2C:
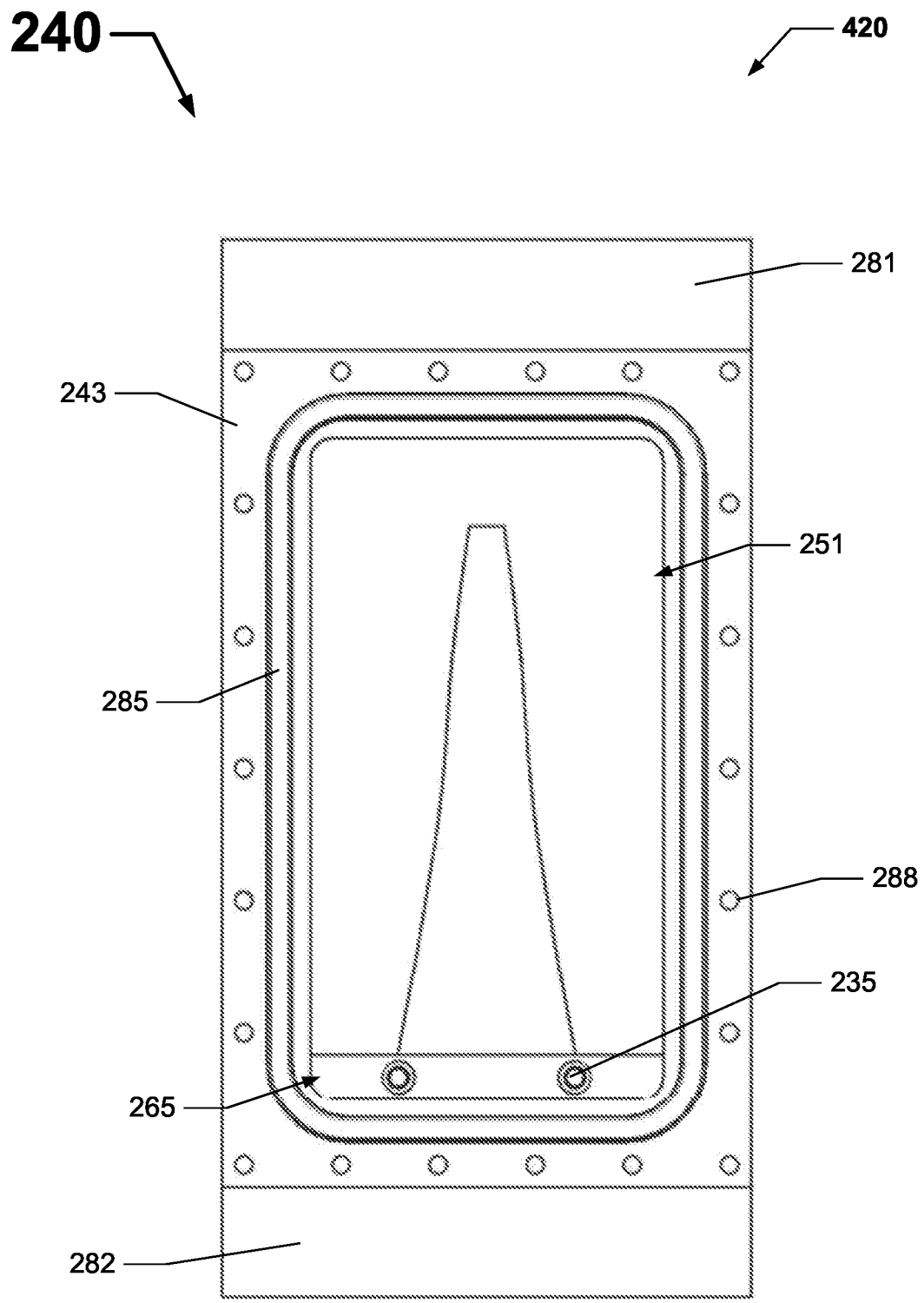
Figure 2D:
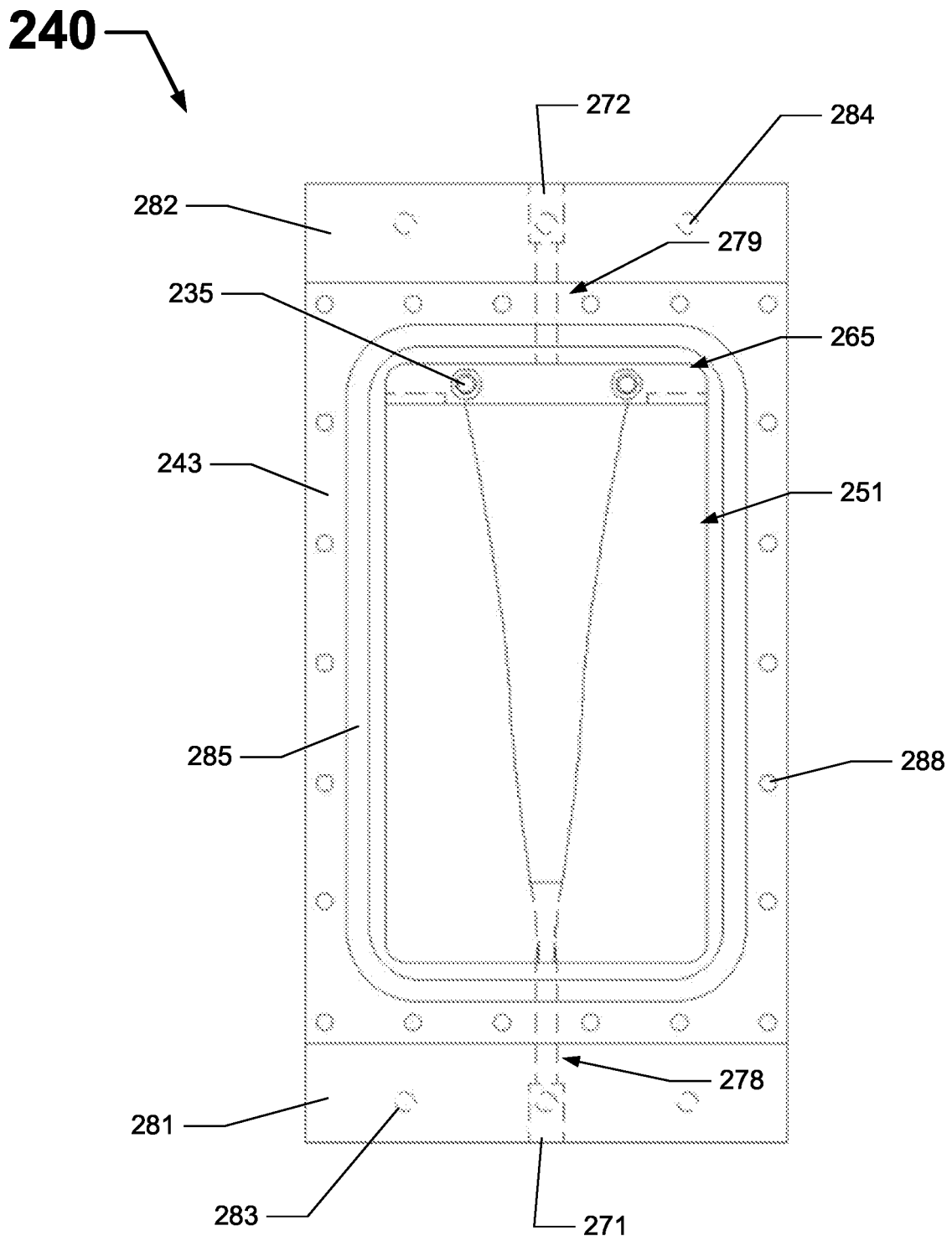

Specifically, FIG. 2A shows an exploded front perspective view of the diverter test cell 240 without the coupling features 235 and the coupling features 288. FIG. 2B shows an exploded rear perspective view of the diverter test cell 240 without the coupling features 235 and the coupling features 288. FIG. 2C shows a top view of the diverter test cell 240. FIG. 2D shows a semi-transparent top view of the diverter test cell 240. FIG. 3A shows a semi-transparent top view of the enclosure 245. FIG. 3B shows a side view of the enclosure 245. FIG. 3C shows a front view of the enclosure 245. FIG. 4A shows a top view of the insert body 251. FIG. 4B shows a front view of the insert body 251. FIG. 4C shows a semi-transparent perspective view of the insert body 251. FIG. 4D shows a rear view of the insert body 251. FIG. 4E shows a cross-sectional side view of the insert body 251. FIG. 5A shows a bottom view of the adapter 265. FIG. 5B shows a front view of the adapter 265. FIG. 5C shows a semi-transparent perspective view of the adapter 265.

Referring to FIGS. 1 through 5C, the diverter test cell 240 (including components thereof such as the enclosure 245 and the replaceable insert 250) of FIGS. 2A through 2D is an example of the diverter test cell 140 (including components thereof such as the enclosure 145 and the replaceable insert 150) of FIG. 1 above. The enclosure 245 of the diverter test cell 240 includes a cover 241 (also called an enclosure cover 241 herein) and a body 270 (also called an enclosure body 270 herein).

The enclosure cover 241 is removably (or simply moveably) coupled, directly or indirectly, to the enclosure body 270. When the enclosure cover 241 is fully coupled to the enclosure body 270, as shown in FIGS. 2C and 2D, the cavity 274 formed by the enclosure body 270 becomes enclosed, making the removable insert 250 inaccessible. Conversely, when the enclosure cover 241 is not fully coupled (e.g., removed, hingedly opened) to the enclosure body 270, the cavity 274 formed by the enclosure body 270 becomes open, making the removable insert 250 accessible within the cavity 274 (for removing the removable insert 250) and/or making the cavity 274 accessible (for inserting the removable insert 250 into the cavity 274).

The enclosure cover 241 and the enclosure body 270 can be coupled to each other in any of a number of ways. For example, in this case, the enclosure cover 241 includes multiple coupling features 242 in the form of apertures (e.g., with featureless walls, with threaded walls), and the enclosure body 270 includes multiple coupling features 273 in the form of apertures (e.g., with featureless walls, with threaded walls). The coupling features 242 of the enclosure cover 241 are configured to align with the coupling features 273 of the enclosure body 270 when the enclosure cover 241 is positioned with respect to the enclosure body 270 to enclose the cavity 274. When this alignment of the coupling features 242 and the coupling features 273 occurs, then multiple independent coupling features 288 (e.g., bolts (as in this case), screws) can be inserted (e.g., rotatably) into the respective coupling features 242 and coupling features 273.

As another example, the enclosure cover 241 and the enclosure body 270 can include portions of a hinge that are joined by a pin. Further, the enclosure cover 241 and the enclosure body 270 can also include portions of one or more clamps that can engage with each other when the enclosure cover 241 is positioned with respect to the enclosure body 270 to enclose the cavity 274. Regardless of the configuration of the coupling features 242 of the enclosure cover 241 and the complementary coupling features 273 of the enclosure body 270, the coupling features 242 and the coupling features 273 can be coupled to and decoupled from each other to enclose or provide access to, respectively, the cavity 274.

Further, the coupling features 242 of the enclosure cover 241 and the complementary coupling features 273 of the enclosure body 270, when directly or indirectly coupled to each other, as well as the entirety of the insert 250, can be configured to withstand the various conditions (e.g., high temperature, low temperature, high pressure, low pressure, high flow rate of the fluid, low flow rate of the fluid) that can exist when the fluid is being tested in the diverter test call 240. For example, in this case, the independent coupling features 288 that are used to couple the enclosure cover 241 and the enclosure body 270 to each other can be tightened within a range of torques to ensure that a desired pressure (e.g., up to 100 psi) is maintained within the cavity 274 during testing. Similarly, the various characteristics (e.g., material) of the rest of the enclosure cover 241 and the enclosure body 270 can be configured to withstand whatever conditions exist during use of the diverter test cell 240.

In certain example embodiments, the enclosure cover 241 is made of a transparent (see-through) material, allowing a user to see the insert during testing of a fluid when the enclosure cover 241 is coupled to the enclosure body 270. In this way, a particular design of the insert body 251 of the insert 250 (discussed below) allows for testing and visualization of the ability of a channel 255 (e.g., simulating a diverter) to create a plug. This can provide clarity as to whether a diverter will work if it is located at the tip of a fracture in a subterranean formation.

There can be any number of coupling features 242 of the enclosure cover 241 and the complementary coupling features 273 of the enclosure body 270. The number of coupling features 242 of the enclosure cover 241 can be the same as, or different than, the number of complementary coupling features 273 of the enclosure body 270. The coupling features 242 of the enclosure cover 241 and the coupling features 273 of the enclosure body 270 are configured to complement each other.

The coupling features 242 of the enclosure cover 241 are disposed around the outer perimeter of the body 243 (also sometimes called the enclosure cover body 243) of the enclosure cover 241. The coupling features 242 in this case traverse the entire thickness of the body 243 of the enclosure cover 241. The coupling features 242 in this example are spaced substantially equidistantly around the outer perimeter of the body 243 of the enclosure cover 241. In other embodiments, the coupling features 242 can have any other type of space and/or be disposed at other locations on the body 243 of the enclosure cover 241.

The enclosure body 270 can have any of a number of shapes and/or sizes. The enclosure body 270 can be formed by one or more walls and/or surfaces. In this case, the enclosure body 270 is formed from a single piece with multiple walls and multiple surfaces. Specifically, the enclosure body 270 of FIGS. 2A through 2D includes a bottom wall 275, a front wall 278, a rear wall 279, a left side wall 276, and a right side wall 277. The front wall 278 has a top surface 281, and the rear wall 279 has a top surface 282. To make room for the enclosure cover 241, part of the front wall 278, part of the rear wall 279, the left side wall 276, and the right side wall 277 are shorter in height, uniformly having a top surface 269 (also sometimes called a flange 269). In this case, the coupling features 273 are disposed in (specifically, drilled into) the front wall 278, the rear wall 279, the left side wall 276, and the right side wall 277 through the flange 269.

The flange 269 is substantially planar. Also, the top surface 281 of the front wall 278 and the top surface 282 of the rear wall 279 are substantially planar with each other and substantially parallel to the flange 269. In this example, the distance between the top surfaces 281, 282 and the flange 269 is substantially the same as the thickness of the body 243 of the enclosure cover 241. In this way, when the enclosure cover 241 is coupled to the enclosure body 270, the top surface of the body 243 of the enclosure cover 241 is substantially planar with the top surface 281 and the top surface 282. In this way, the enclosure 245 is substantially a rectangular cuboid when the enclosure cover 241 is coupled to the enclosure body 270.

The outer surfaces of the various walls (e.g., front wall 278, right side wall 276) of the enclosure body 270 are all substantially smooth (featureless) and planar in this case. The cavity 274 within the enclosure body 270 is formed by the inner surfaces of the bottom wall 275, the front wall 278, the rear wall 279, the right side wall 276, and the left side wall 277. These inner surfaces are all substantially smooth (featureless) and planar in this case. In alternative embodiments, the the outer surface and/or the inner surface of one or more walls of the enclosure body 270 can include one or more features (e.g., ridges) and/or be non-planar. The shape and size of the cavity 274 can vary based on the shape, size, and other characteristics of the replaceable insert 250, which is disposed within the cavity 274.

To generate a seal between the enclosure body 270 and the enclosure cover 241, a sealing member 285 can be disposed between the enclosure body 270 and the enclosure cover 241 when they are coupled to each other. The sealing member 285 can provide a barrier (e.g., for moisture, for dust, to maintain a pressure within the cavity 274) between the enclosed cavity 274 and the ambient environment outside of the enclosure 245. The sealing member 285 can be made of an elastomeric material (e.g., rubber) and can take any of a number of forms. Examples of a sealing member 285 can include, but are not limited to, a gasket, on O-ring, and silicone. To hold the sealing member 285 in place, the bottom surface of the enclosure cover 241 and/or the flange 269 of the enclosure body 270 can have one or more channels disposed therein. For example, in this case, there is a channel 276 disposed in the flange 269 of the enclosure body 270, and the sealing member 285 is disposed in the channel 276. There can be a single continuous channel 276, as in this case. Alternatively, there can be multiple channels, where each channel can be continuous or discrete.

In some cases, the bottom surface of the enclosure cover 241 and/or the flange 269 of the enclosure body 270 can include one or more of a number of other features (e.g., a key, a key receiver, a slot, a detent, a recess, a protrusion) that can provide a particular orientation and/or positioning between the enclosure cover 241 and the enclosure body 270. Such features can also provide a type of barrier, which can replace or complement the one or more sealing members 285, between the resulting enclosed cavity 274 and the ambient environment outside of the enclosure 245.

In some cases, the surfaces of the enclosure body 270 and/or the enclosure cover 241 that form the cavity 274 can include one or more of any of a number of different features that directly or indirectly orient and/or retain the removable insert 250 within the cavity 274, as during testing of a fluid. For example, in this case, there are two coupling features 263 (coupling feature 263-1 and coupling feature 263-2), both in the form of apertures, disposed in the bottom wall 275 at the top surface. The coupling features 263 of the enclosure body 270 have characteristics (e.g., size, position, threading) that are designed to align with and/or couple, directly or indirectly, to complementary coupling features (in this case, coupling features 511, discussed below) of the adapter 265.

Since the enclosure 245 is used to test one or more fluids, the enclosure 245 can include one or more points of access for the fluid being tested to enter and/or leave the cavity 274 during testing. For example, in this case, there is an inlet port 271 that traverses the front wall 281 and an outlet port 272 that traverses the rear wall 282. Both the inlet port 271 and the outlet port 272 provide communication between the cavity 274 and a point outside the enclosure 245. The inlet port 271 and the outlet port 272 can have any of a number of configurations. In this case, the inlet port 271 and the outlet port 272 are tubular with smooth outer surfaces along their entire lengths. The configuration of the inlet port 271 can be the same as, or different than, the configuration of the outlet port 272. The inlet port 271 and the outlet port 272 can be connected to and/or have disposed therein piping, such as the piping 188 discussed above with respect to FIG. 1.

In certain example embodiments, the replaceable insert 250 (also more simply called an insert 250 herein) can be inserted into and removed from the cavity 274 of the enclosure 245. The example insert 250 can include one or multiple components. In this case, the components of the insert 250 include the insert body 251 and the adapter 265, where the insert body 251 is used in testing a fluid (e.g., the fluid flows through or over the insert body 251 or portions thereof), and where the adapter 265 is used to secure the insert body 251 within the cavity 274 of the enclosure 245. The insert body 251 and the adapter 265 can be formed in any of a number of ways using any of a number of materials. For example, the insert body 251 and the adapter 265 can be formed from plastic using a three-dimensional printer. In some cases, one or more parts (e.g., the top surface 452) of the insert body 251 can be etched with markings, such as a ruler. When the insert body 251 is made of plastic, the particular composition of the plastic can be variable and selected in order to simulate proppant embedment and rock properties.

In this example, the insert body 251 is made from a single piece with the channel 455 disposed therein and with a pair of protrusions 458 that extend therefrom. The insert body 251 can have a single channel 455 or multiple channels. The insert body 251 can have a single protrusion 458 or more than two protrusions 458 disposed thereon. The insert body 251 can additionally or alternatively include one or more of a number of other features (e.g., recesses, detents, slots, tabs). In alternative embodiments, the insert body 251 can be made from multiple pieces that are coupled to each other. Similarly, the insert body 251 can have alternatively have multiple channels 455 disposed therein.

The insert body 251 can have multiple surfaces. In this case, the insert body 251 has a top surface 452, a bottom surface 447, a left surface 463, a right surface 461, a front surface 462, and a rear surface 464. These surfaces of the insert body 251 are substantially smooth and planar in this case, although in alternative embodiments one or more of these surfaces can have any of a number of other characteristics (e.g., curved, textured). The channel 455 disposed within the insert body 251 is also defined by a number of surfaces. In this case, the proximal end 456 of the channel 455 forms a cylindrical tube (having a substantially circular cross-sectional shape) having an outer surface 446 that extends upward at a gradual angle relative to the bottom surface 447 for approximately the first fifth of the length of the insert body 251 until approaching a transition point 444 toward the top surface 452 of the insert body 251.

At that transition point 444, the channel 255 becomes a type of elongated open-topped prism that increases in width and decreases in height as the channel 255 reaches the distal end 457. The channel 255 is continuously maintained from the proximal end 456 to the distal end 457. In the open-topped prism part of the single channel 255, the cross-sectional shape can be substantially an open-topped rectangle along its length, having a bottom surface 253, a left surface 248, and a right surface 249. In alternative embodiments, the cross-sectional shape of the channel 255 can be another shape (e.g., a triangle, a semicircle, a semi-ellipse) aside from rectangular. As stated above, the channel 255 in this case is designed to provide a constant flow rate of fluid flowing therethrough between the proximal end 456 and the distal end 457 of the insert body 251. For this to occur, the cross-sectional area at every point in the channel 255 along its entire length (e.g., between the proximal end 456 and the distal end 457) is substantially the same.

When the enclosure cover 241 is coupled to the enclosure body 270 with the insert body 251 disposed in the cavity 274 of the enclosure 245, the bottom surface of the body 243 of the enclosure cover 241 closes off the top part of the channel 255 (at least between the transition point 644 and the distal end 457), where the top surface 252 of the insert body 251 is absent. Also, where the top surface 452 of the insert body 251 is present, the top surface 452 abuts against the bottom surface of the body 243 of the enclosure cover 241 when the enclosure cover 241 is coupled to the enclosure body 270 and the insert 250 is disposed in the cavity 274 of the enclosure 245.

In this case, the center along the length of the channel 455 is coincident with the center of the insert body 251 along the length of the insert body 251. For example, the center of the proximal end 456 of the channel 455 is positioned in substantially the center (both in terms of height and width) of the front surface 462 of the insert body 251. As another example, the center of the distal end 457 of the channel 455 is coincident with the center (along the width but not the height) of the insert body 251.

Each channel 455 is configured to allow a fluid flow therethrough. Each channel 455 can run continuously along the length of the insert body 251. The channel 455 of the insert body 251 of the insert 250 can be configured to allow one or more fluids being tested to pass therethrough in a controlled manner. For example, as in this case, the channel 455 of the insert body 251 is configured to allow a fluid being tested to pass therethrough at a substantially constant flow rate. In such a case, the channel 455 can be configured to simulate a condition, such as the narrow end of a fracture in a subterranean formation adjacent to a wellbore, when a fluid flows therethrough during a test.

To help secure the insert body 251 within the cavity 274 of the enclosure 245, the insert body 251 can include one or more features. For example, in this case, the insert body 251 includes two protrusions 458 (protrusion 458-1 and protrusion 458-2) that extend from the rear surface 464. Protrusion 458-1 is located adjacent to the bottom surface 462 and the left surface 463 of the insert body 251. Protrusion 458-2 is located adjacent to the bottom surface 462 and the right surface 461 of the insert body 251. In this case, protrusion 458-1 and protrusion 458-2 are configured substantially the same as each other. In alternative embodiments, one protrusion 458 (e.g., protrusion 458-1) can have one or more characteristics (e.g., length, width, height, slope) that are different from a corresponding characteristic of another protrusion 458 (e.g., protrusion 458-2). Each protrusion 458 in this example is wedge-shaped to correspond with a wedge-shaped recess 512 disposed in the adapter 265, as discussed below.

In certain example embodiments, the insert 250 can include one or more sensor devices (similar to the sensor device 160 of FIG. 1) to measure one or more parameters associated with fluid that flows through the channel 455 during testing. For example, as shown in FIG. 4E, an optional sensor device 460 can be embedded in the insert body 251 of the insert 250 adjacent to the bottom surface 453 of the channel 455 to measure one or more parameters (e.g., flow rate, temperature, pressure) associated with testing a fluid that flows through the channel 455. In addition or in the alternative, one or more sensor devices can be embedded in other components (e.g., the adapter 265 of the insert 250, in the enclosure body 270) of the test cell 240.

The adapter 265 (also called by other names, such as a locking bar 265) of the insert 250 can have multiple surfaces. In this case, the adapter 265 has a top surface 516, a bottom surface 514, left surface 513, a right surface 515, a front surface 518, and a rear surface 517. Aside from the top surface 516, all of these surfaces of the adapter 265 are substantially smooth and planar in this case, although in alternative embodiments one or more of these surfaces can have any of a number of other characteristics (e.g., curved, textured). The top surface 516 is planar but downward sloping from each end, meeting at a curved valley 519 in the middle of the top surface 516. The top surface 516 is symmetrical along a vertical axis when viewed from the front, as shown in FIG. 5B.

The adapter 265 of the insert 250 can include one or more features that serve one or more of a number of different purposes. For example, the configuration of the top surface 516 of the adapter 265, as described above and shown in FIG. 5B, is designed to funnel the fluid that has reached the distal end 457 of the channel 455 of the insert body 251 into the outlet port 272 of the enclosure body 270. In this way, the configuration of the top surface 516 depends on multiple factors, including but not limited to the location of the beginning of the outlet port 272 relative to the distal end 457 of the channel 455, the width of the channel 455 at the distal end 457, and the flow rate of the fluid through the channel 455. In some cases, the top surface 516 of the adapter 265 can be considered part of the channel 455. In such a case, the distal end 457 represents the distal end of the channel 455 with respect to the insert body 251 and not the distal end of the channel 955 of the entire insert 250.

As another example, the adapter 265 can include one or more features to help secure the insert body 251 within the cavity 274 of the enclosure 245. In this case, the adapter 265 has two such features in the form of wedge-shaped recesses 512 (recess 512-1 and recess 512-2). As discussed above, the characteristics (e.g., length, width, height, slope) of one recess 512 is configured to complement the corresponding characteristics of the protrusion 458 of the insert body 251 that engages with/couples to that recess 512. In alternative embodiments, rather than one or more protrusions 458 and recesses 512, the features of the insert body 251 and the adapter 265 that are designed to keep the insert body 251 secured in a specific location within the cavity 274 of the enclosure 245 can take one any of a number of other forms (e.g., coupling features, fastening devices) that those of ordinary skill in the art will appreciate.

As yet another example, the adapter 265 can include one or more coupling features that are configured to directly or indirectly couple the adapter 265 to the enclosure body 270. In this case, the adapter 265 includes two coupling features 511 (coupling feature 511-1 and coupling feature 511-2), each in the form of an aperture 522 that traverses the height of the adapter 265 and a counterbore 521 at the top surface 516. Specifically, coupling feature 511-1 includes an aperture 522-1 that traverses the height of the left side of the adapter 265 and a counterbore 521-1 at the top surface 516 that extends about halfway into the height of the adapter 265 at the point of entry. Similarly, coupling feature 511-2 includes an aperture 522-2 that traverses the height of the left side of the adapter 265 and a counterbore 521-2 at the top surface 516 that extends about halfway into the height of the adapter 265 at the point of entry.

In this case, the configuration of the coupling features 511 and their distance from the curved valley 519 in the top surface 516 are identical to each other. In alternative embodiments, the configuration and/or one or more characteristics of one coupling feature 511 (e.g., coupling feature 511-1) can differ from the configuration and/or corresponding characteristics of another coupling feature 511 (e.g., coupling feature 511-2). Each coupling feature 511 is configured to complement a coupling feature 263 of the enclosure body 270. In this case, coupling feature 511-1 complements coupling feature 263-1, and coupling feature 511-2 complements coupling feature 263-2.

When the coupling feature 511-1 aligns with the coupling feature 263-1, an independent coupling feature 235-1 (e.g., a screw, a bolt) can be inserted (e.g., threadably) into the coupling feature 511-1 and the coupling feature 263-1 to secure the adapter 265 (and so also the insert body 251 when the protrusions 458 of the insert body 251 and the recesses 512 of the adapter 265 are engaged with each other) and the enclosure body 270 to each other. Similarly, when the coupling feature 511-2 aligns with the coupling feature 263-2, an independent coupling feature 235-2 (e.g., a screw, a bolt) can be inserted (e.g., threadably) into the coupling feature 511-2 and the coupling feature 263-2 to secure the adapter 265 (and so also the insert body 251 when the protrusions 458 of the insert body 251 and the recesses 512 of the adapter 265 are engaged with each other) and the enclosure body 270 to each other. The counterbore 521 of each coupling feature 511 keep the coupling feature 235 disposed therein from protruding above the plane defined by the top surface 516 of the adapter 265.

Under the configuration of the test cell 240 and its components of FIGS. 2A through 5C, assembly of the test cell 240 begins by placing the insert body 251 of the insert 250 in the cavity 274 of the enclosure body 270, then placing the adapter 265 of the insert 250 in the cavity 274 so that the recesses 512 of the adapter 265 engage the protrusions 458 of the insert body 251, then couple the adapter 265 to the enclosure body 270 using the coupling features 511 of the adapter, the coupling features 263 of the enclosure body 270, and the independent coupling features 235, and finally couple the enclosure cover 241 to the enclosure body 270 using the coupling features 273 of the enclosure body 270, the coupling features 242 of the enclosure cover 241, and the independent coupling features 288. Once testing (or a stage of the testing) has concluded, the insert 250 can be removed from the cavity 274 of the enclosure 245 by reversing the process. When the insert 250 is removed after a test, the insert body 251 can be analyzed for characteristics or results such as, but not limited to, embedment, segregation of particle size, test of chemical properties.

The insert 250, when used in the diverter test cell 240, can be utilized to validate commercial diverter materials (e.g., proppant) that are available on the market in terms of plugging ability, transport, and dissolution of materials after completion of a test. As discussed above, the channel 255 of the insert 250 can be designed to simulate the shape of a fracture tip while maintaining a constant flow area. The channel 255 of the insert 250 is designed to be oriented in any direction. When the transparent enclosure cover 241 of the enclosure 245 is transparent, this allows for observation of the flow of fluid through the channel 255 of the insert 250 in real time. A test using the diverter test cell 240 can represent a simulation of an operation in a subterranean formation.

Throughout a test, the diverter test cell 240 (and so also its contents, such as the insert 250) can be heated or cooled as required to simulate downhole conditions and observe changes in the fluid within the diverter test cell 250. For example, after a channel 255 of the insert 250 is plugged by a fluid, the diverter test cell 240 can be heated to determine the effectiveness of the fluid for that particular channel 255. At the completion of a test, the insert 250 can be removed for further analysis and a new insert 250, either with the same channel 255 configuration or a different channel 255 configuration, can be inserted into the cavity 274 of the enclosure body 270 and enclosed by the enclosure cover 241 to begin a new test. This example replaceable insert 250 reduces the number of test cells 240 required to analyze a fluid. The insert 250 also reduces the amount of time required to complete multiple tests. Alternative inserts 250 having different configurations of the channel 255 can be used to change the flow size or shape to confirm various aspects of the fluid (e.g., diverter materials). For example, the insert 250 can provide clarity as to whether a fluid will work as desired if at a fracture tip in a subterranean formation.

More specifically, a diverter test cell 240 with an example insert 250 can be used to determine if a particular fluid (e.g., a proppant) can plug off toward the end of the channel 255

(simulating the end of a fracture tip). Past research has shown, of example, that fracture widths of less than 3 proppant grains will cause proppant bridging and screen out. Knowing that proppants in the field can be 30/50, 40/70, or 100 mesh, a set of minimum widths can be calculated from known proppant data and/or other sources (e.g., API specifications). This data can then be used to create one or more channels 255 for flow testing of the fluid in the diverter test cell 240. Some testing parameters can include, but are not limited to, having an outlet ID of 0.25 inches with the test limitation of no pressure, maintaining a constant flow area along the channel 255 to mitigate the pressure limit, and providing a smooth transition from round to square/rectangular cross-sectional areas for the channel 255. Using a width of the channel 255 as a point for each cross-sectional area of the channel 255, and keeping the cross-sectional area of the channel 255 constant, the dimensions of the channel 255 at various points along its length can be determined.

In alternative embodiments, the adapter 265 can be an optional component of the insert 250. In the absence of the adapter 265, the insert body 251 can include one or more features (e.g., one or more coupling features) that secures the insert body 251 within the cavity 274 of the enclosure 245 and/or that funnels the fluid that flows through the channel 255 to the distal end 257 into the outlet port 272 of the enclosure body 270. In yet other alternative embodiments, when the adapter 265 is absent, the enclosure body 270 can include one or more features (e.g., coupling features) that secures the insert body 251 within the cavity 274 of the enclosure 245 and/or that funnels the fluid that flows through the channel 255 to the distal end 257 into the outlet port 272 of the enclosure body 270.

Figure 6A:
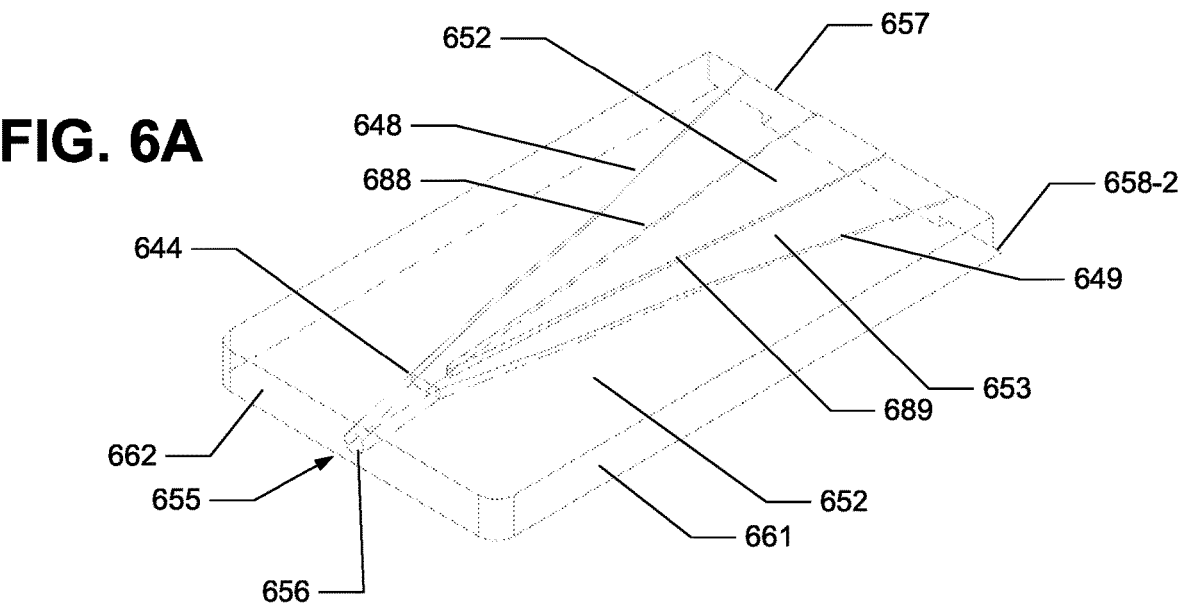
FIGS. 6A and 6B show another insert body of an insert according to certain example embodiments.
Figure 6B:
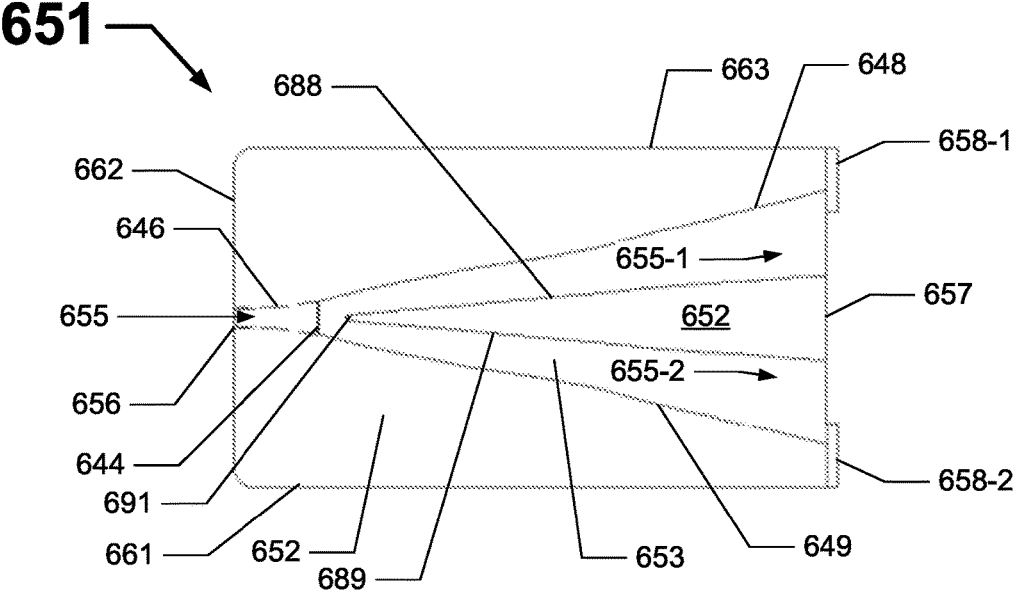

FIGS. 6A and 6B show another insert body 651 of an insert according to certain example embodiments. Specifically, FIG. 6A shows a semi-transparent perspective view of the insert body 651. FIG. 6B shows a top view of the insert body 651. Referring to FIGS. 1 through 6B, the insert body 651 can be used as a substitute for the insert body 251 discussed above. The insert body 651 is similar to the insert body 251 of FIGS. 2A through 2D and FIGS. 4A through 4E, except as discussed below. For example, the insert body 651 is made from a single piece with a channel 655, a channel 655-1, and a channel 655-2 disposed therein and with a pair of protrusions 658 that extend therefrom. The insert body 651 of FIGS. 6A and 6B has a channel 655 that splits into 2 channels: channel 655-1 and channel 655-2. The insert body 651 has two protrusions 658 (protrusion 658-1 and protrusion 658-2) disposed thereon. The protrusions 658 are substantially the same as the protrusions 258 discussed above.

The insert body 651 in this case has a top surface 652, a bottom surface (hidden from view), a left surface 663, a right surface 661, a front surface 662, and a rear surface 664. These surfaces of the insert body 651 are substantially smooth and planar in this case. The proximal end 656 of the channel 655 forms a cylindrical tube (having a substantially circular cross-sectional shape) having an outer surface 646 that extends upward at a gradual angle relative to the bottom surface of the insert body 651 for approximately the first seventh of the length of the insert body 651 until approaching a transition point 644 toward the top surface 652 of the insert body 651.

At that transition point 644, the channel 655 becomes a type of elongated open-topped prism that increases in width and decreases in height as the channel 655 reaches a division point 691, where the single channel 655 splits into two channels (the channel 655-1 and the channel 655-2). Channel 655-1 and channel 655-2 each are continuously maintained from the division point 691 to the distal end 657. In the open-topped prism part of the single channel 655, the cross-sectional shape can be substantially an open-topped rectangle along its length, having a bottom surface 653, a left surface 648, and a right surface 649. In the open-topped prism part of the channel 655-1, the cross-sectional shape can be substantially an open-topped rectangle along its length, having a bottom surface 653, a left surface 648, and a right surface 688. In the open-topped prism part of the channel 655-2, the cross-sectional shape can be substantially an open-topped rectangle along its length, having a bottom surface 653, a left surface 689, and a right surface 649. In alternative embodiments, the cross-sectional shape of the channel 655, the channel 655-1, and/or the channel 655-2 can be another shape (e.g., a triangle, a semicircle, a semi-ellipse) aside from rectangular.

As stated above, the channel 655, and channel 655-1, and the channel 655-2 in this case are designed to provide a constant flow rate of fluid flowing therethrough between the proximal end 646 and the distal end 657 of the insert body 651. For this to occur, the cross-sectional area at every point in the channel 655 along its entire length (e.g., between the proximal end 656 and the transition point 644, between the transition point 644 and the division point 691) is substantially the same. Similarly, the sum of the cross-sectional area at a point in the channel 655-1 along the length of the insert body 651 plus the cross-sectional area at the same point in the channel 655-2 along the length of the insert body 651 is substantially the same as for every point between the transition point 644 and the distal end 657.

When the enclosure cover 241 is coupled to the enclosure body 270 with the insert body 651 disposed in the cavity 274 of the enclosure 245, the bottom surface of the body 243 of the enclosure cover 241 closes off the top part of the channel 655 (at least between the transition point 644 and the division point 691), the channel 655-1, and channel 655-2, all where the top surface 652 of the insert body 651 is absent. Also, where the top surface 652 of the insert body 651 is present, the top surface 652 abuts against the bottom surface of the body 243 of the enclosure cover 241 when the enclosure cover 241 is coupled to the enclosure body 270 and the insert body 651 is disposed in the cavity 274 of the enclosure 245.

The channel 655, the channel 655-1, and the channel 655-2 are configured to allow a fluid flow continuously therethrough. The combination of the channel 655, the channel 655-1, and the channel 655-2 of the insert body 651 can be configured to allow one or more fluids being tested to pass therethrough in a controlled manner. For example, as in this case, the combination of the channel 655, the channel 655-1, and the channel 655-2 of the insert body 651 are configured to allow a fluid being tested to pass therethrough at a substantially constant flow rate. In such a case, the combination of the channel 655, the channel 655-1, and the channel 655-2 can be configured to simulate a condition, such as the narrow end of a fracture in a subterranean formation adjacent to a wellbore, when a fluid flows therethrough during a test.

The adapter 265 of FIGS. 2A through 2D and 5A through 5C can be used to secure the insert body 651 within the cavity 274 of the enclosure 245 and also to funnel the fluid that flows through the channel 655-1 and the channel 655-2 to the distal end 657 into the outlet port 272 of the enclosure body 270. Alternatively, an adapter having one or more different features and/or a different configuration from the adapter 265 can be used to accompany the insert body 651 to create the insert (e.g., insert 250).

Figure 7A:
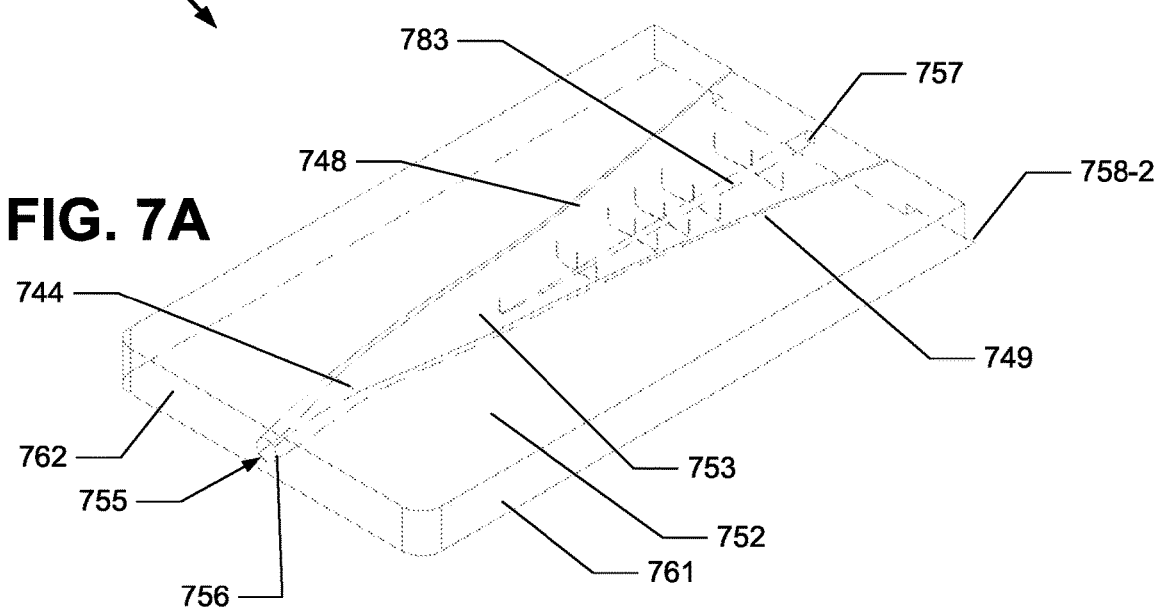
FIGS. 7A and 7B show yet another insert body of an insert according to certain example embodiments.
Figure 7B:
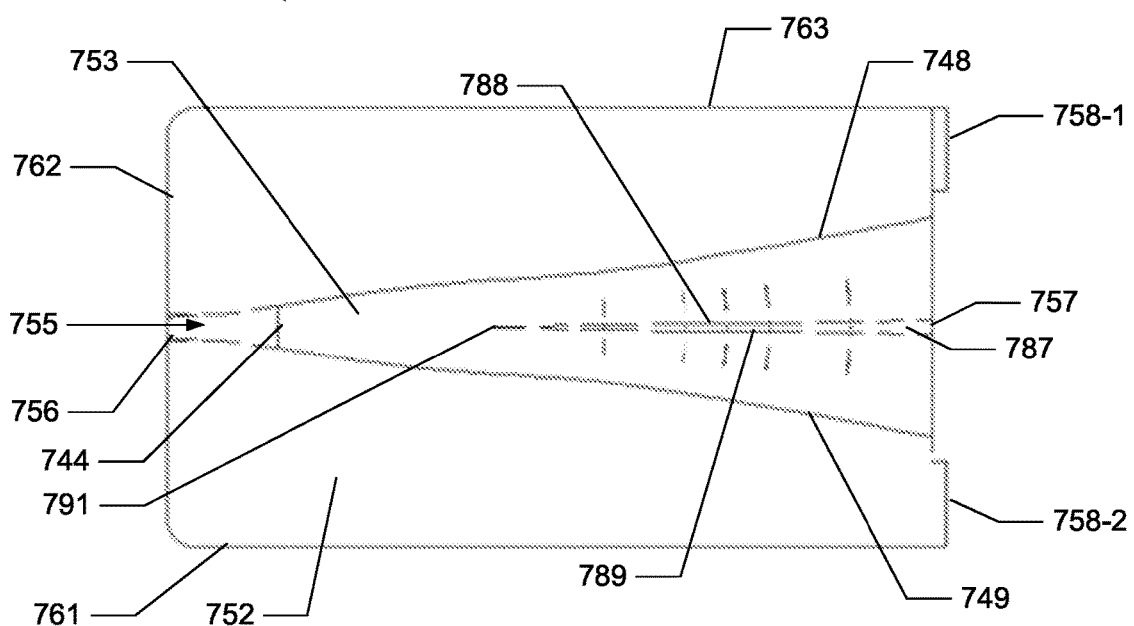

FIGS. 7A and 7B show yet another insert body 751 of an insert according to certain example embodiments. Specifically, FIG. 7A shows a semi-transparent perspective view of the insert body 751. FIG. 7B shows a top view of the insert body 751. Referring to FIGS. 1 through 7B, the insert body 751 can be used as a substitute for the insert body 251 discussed above. The insert body 751 is similar to the insert body 251 of FIGS. 2A through 2D and FIGS. 4A through 4E, except as discussed below. For example, the insert body 751 is made from a single piece with the channel 755 disposed therein and with a pair of protrusions 758 that extend therefrom. The insert body 751 of FIGS. 7A and 7B has two protrusions 758 (protrusion 758-1 and protrusion 758-2) disposed thereon. The protrusions 758 are substantially the same as the protrusions 258 discussed above.

The insert body 751 in this case has a top surface 752, a bottom surface (hidden from view), a left surface 763, a right surface 761, a front surface 762, and a rear surface 764. These surfaces of the insert body 751 are substantially smooth and planar in this case. The proximal end 756 of the channel 755 forms a cylindrical tube (having a substantially circular cross-sectional shape) having an outer surface 746 that extends upward at a gradual angle relative to the bottom surface of the insert body 751 for approximately the first seventh of the length of the insert body 751 until approaching a transition point 744 toward the top surface 752 of the insert body 751. Between the proximal end 756 and the transition point 744, the cross-sectional area of the channel 755 is substantially the same, which means that the diameter of the outer surface 746 is substantially constant between the proximal end 756 and the transition point 744.

At that transition point 744, the channel 755 becomes a type of elongated open-topped prism that increases in width and decreases in height as the channel 755 reaches a division point 791. In the open-topped prism part of the channel 755 between the transition point 744 and the division point 791, the cross-sectional shape along its length is defined by a bottom surface 753, a left surface 748, and a right surface 749. Between the division point 791 and the distal end 757, the additional cross-sectional shape of the channel 755 becomes a combination of the elongated open-topped prism with an additional cross-sectional shape of a semicircle protruding from the bottom middle of the open-topped prism.

As the channel 755 moves from the division point 791 toward the distal end 757, the width of the open-topped prism and the semicircular cross sections increase, while the height of the open-topped prism cross section decreases, and the height of the semicircular cross section increases. In the open-topped prism part of the channel 755 between the division point 791 and the distal end 757, the cross-sectional shape along its length is defined by the bottom surface 753, the left surface 748, and the right surface 749. In the semicircular part of the channel 755 between the division point 791 and the distal end 757, the cross-sectional shape along the length is defined by an outer surface 787 between points 788 and 789 on the bottom surface 753. As stated above, the channel 755 in this case is designed to provide a constant flow rate of fluid flowing therethrough between the proximal end 746 and the distal end 757 of the insert body 751. For this to occur, the cross-sectional area at every point in the channel 755 along its entire length (between the proximal end 756 and the distal end 757) is substantially the same.

When the enclosure cover 241 is coupled to the enclosure body 270 with the insert body 751 disposed in the cavity 274 of the enclosure 245, the bottom surface of the body 243 of the enclosure cover 241 closes off the top part of the channel 755 (at least between the transition point 744 and the distal end 757), all where the top surface 752 of the insert body 751 is absent. Also, where the top surface 752 of the insert body 751 is present, the top surface 752 abuts against the bottom surface of the body 243 of the enclosure cover 241 when the enclosure cover 241 is coupled to the enclosure body 270 and the insert body 751 is disposed in the cavity 274 of the enclosure 245.

The channel 755 is configured to allow a fluid flow continuously therethrough in a controlled manner and at a substantially constant flow rate. In such a case, the channel 755 can be configured to simulate a condition, such as the narrow end of a fracture in a subterranean formation adjacent to a wellbore, when a fluid flows therethrough during a test. The adapter 265 of FIGS. 2A through 2D and 5A through 5C can be used to secure the insert body 751 within the cavity 274 of the enclosure 245 and also to funnel the fluid that flows through the channel 755 to the distal end 757 into the outlet port 272 of the enclosure body 270. Alternatively, an adapter having one or more different features and/or a different configuration from the adapter 265 can be used to accompany the insert body 751 to create the insert (e.g., insert 250).

Figure 8:
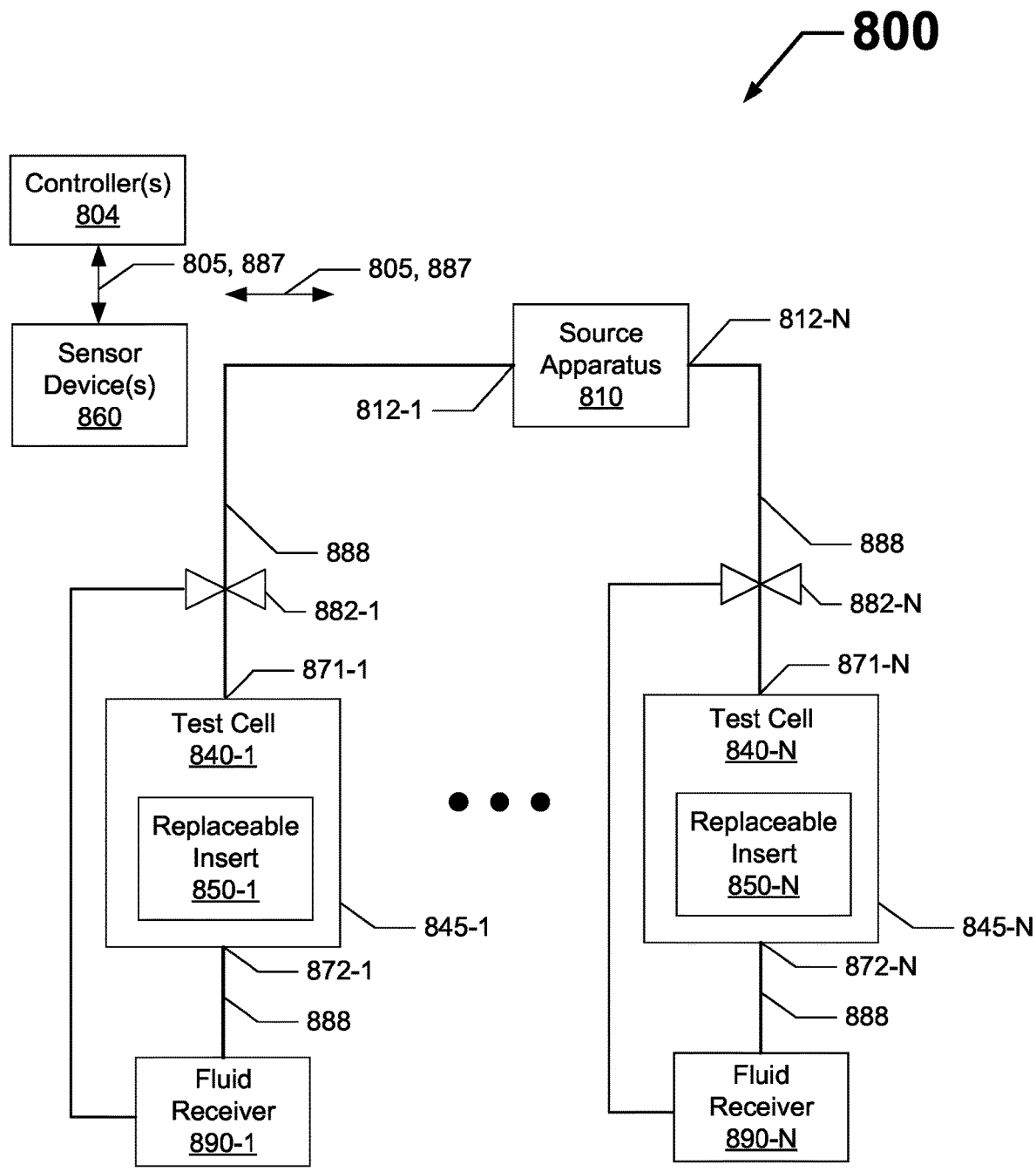
FIG. 8 shows another testing system that includes an apparatus for utilizing multiple diverter test cells according to certain example embodiments.

FIG. 8 shows another testing system 800 that includes a source apparatus 810 for utilizing multiple diverter test cells 840 according to certain example embodiments. Referring to FIGS. 1 through 8, a number of the various components of the testing system 800 of FIG. 8 are substantially the same as the corresponding components of the system 100 of FIG. 1. Specifically, the controller 804, the sensor devices 860, the piping 888, each of the test cells 840 (including the corresponding replaceable inserts 850 and the enclosure 845), each of the fluid receivers 890, the communication links 805, and the power transfer links 887 of the testing system 800 of FIG. 8 are substantially the same as the apparatus 110, the controller 104, the sensor devices 160, the piping 188, the test cell 140 (including the replaceable insert 150 and the enclosure 145), the fluid receiver 190, the communication links 105, and the power transfer links 187 of the system 100 of FIG. 1.

One difference between the testing system 800 of FIG. 8 and the system 100 of FIG. 1 is with the source apparatus 810. While the functionality and various components of the source apparatus 810 of FIG. 8 are substantially the same as the apparatus 100 of FIG. 1, the source apparatus 810 of the testing system 800 has multiple outlets 812 (e.g., outlet 812-1, outlet 812-N) rather than a single outlet 112 of the apparatus 110 of the system 100. Each outlet 812 of the source apparatus 810 is configured to provide fluid to one or more test cells 840 (e.g., test cell 840-1, test cell 840-N). Piping 888 is connected to each outlet 812 to distribute the fluid being tested by a particular test cell 840.

Another difference between the testing system 800 of FIG. 8 and the system 100 of FIG. 1 is that one or more valves 882 (e.g., valve 882-1, valve 882-N) are placed in-line with the piping 888 at various locations to control the flow of fluid therethrough. In this case, the valves 882 are located between an outlet 812 of the source apparatus 810 and a test cell 840. For example, valve 882-1 is located between outlet 812-1 of the source apparatus 810 and test cell 840-1, and valve 882-N is located between outlet 812-N of the source apparatus 810 and test cell 840-N. In this case, the valves 882 are used as bypass valves so that fluid can bypass a test cell 840.

When a valve 882 is placed in a position to bypass a test cell 840, the valve 882 directs the fluid flowing therethrough to flow through piping 888 directly to a fluid receiver 890 (e.g., fluid receiver 890-1, fluid receiver 890-N). As an example, when the valve 882-1 is placed in a position to bypass the test cell 840-1, the fluid is directed by the valve 882-1 through piping 888 directly to the fluid receiver 890-1. As another example, when the valve 882-N is placed in a position to bypass the test cell 840-N, the fluid is directed by the valve 882-N through piping 888 directly to the fluid receiver 890-N. A valve 882 can be operated by a user or the controller 804. In alternative embodiments, rather than having multiple fluid receivers 890, one for each test cell 840, multiple test cells 840 can output fluid to one fluid receiver 890.

A valve 882 can have one or more of any of a number of configurations, including but not limited to a guillotine valve, a ball valve, a gate valve, a butterfly valve, a pinch valve, a needle valve, a plug valve, a diaphragm valve, and a globe valve. One valve 882 (e.g., valve 882-1) can be configured the same as or differently compared to another valve 882 in the testing system 800. Also, one valve 882 can be controlled the same as or differently compared to another valve 882 in the testing system 800.

The source apparatus 810 can be operated in any of a number of ways. For example, a test can be performed by directing fluid to all test cells 840 simultaneously. Fluid can bridge off of one test cell 840 (e.g., test cell 840-1), forcing the fluid to move to the next test cell 840. If a problem arises (e.g., a test cell 840 fails), the valve 882 for that test cell 840 can be operated to bypass the test cell 840. The source apparatus 810 can direct fluid to one outlet 812 (e.g., outlet 812-1) with one set of characteristics (e.g., composition of the fluid, pressure, temperature, flow rate) while simultaneously directing another fluid to another outlet 812 with one or more different characteristics.

Figure 9A:
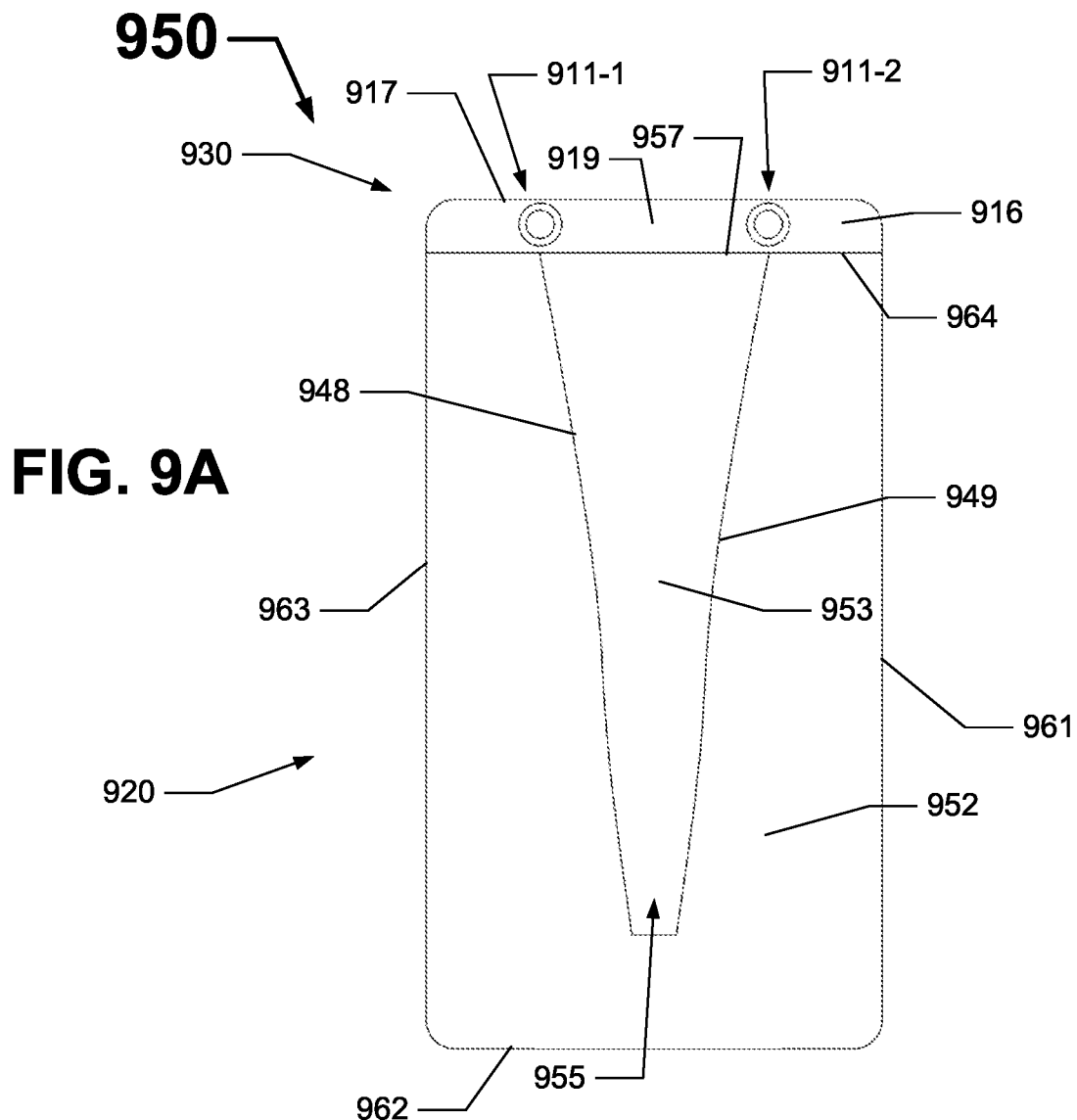
FIGS. 9A through 9D show various view of another replaceable insert according to certain example embodiments.
Figure 9B:
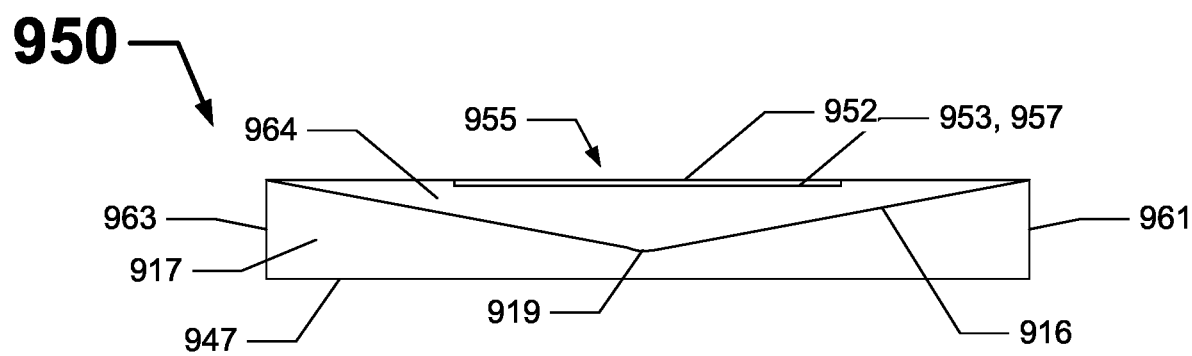
Figure 9C:
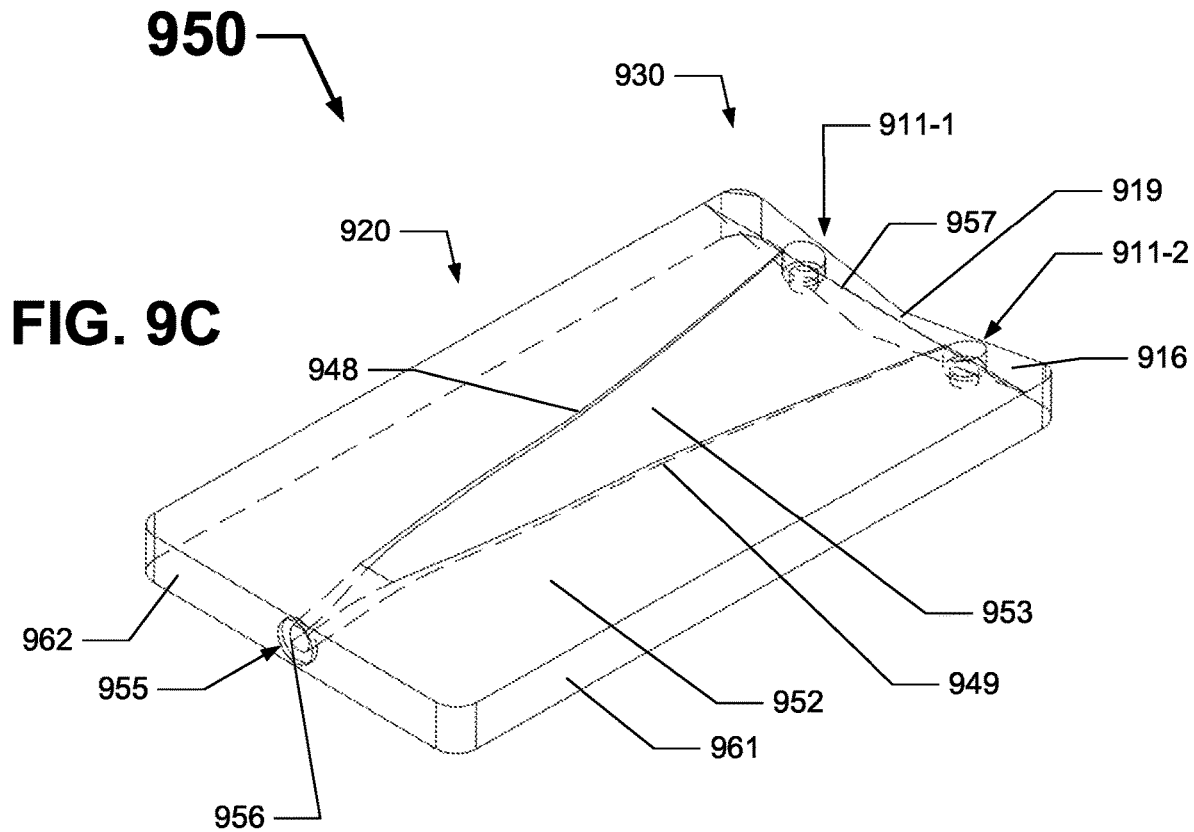
Figure 9D:
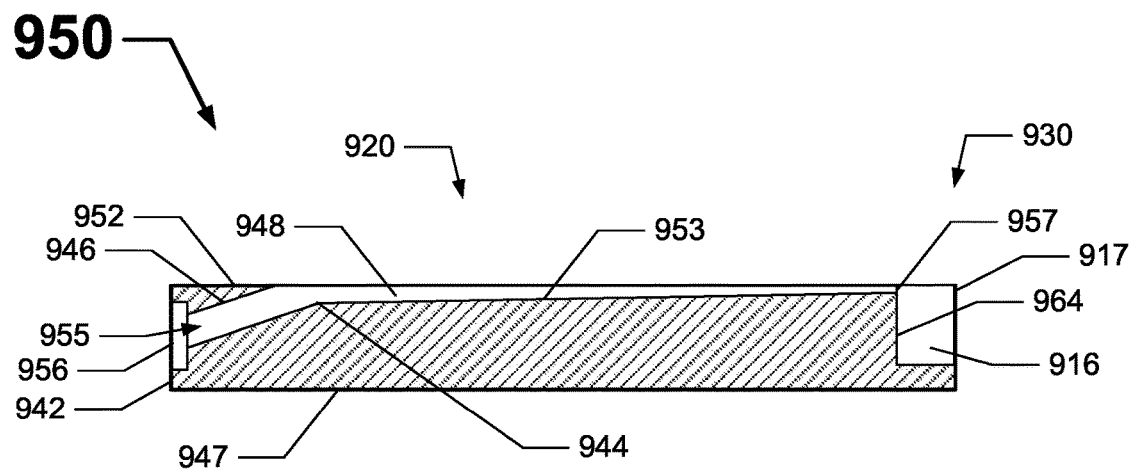

FIGS. 9A through 9D show various view of another replaceable insert 950 according to certain example embodiments. Specifically, FIG. 9A shows a top view of the replaceable insert 950. FIG. 9B shows a rear view of the replaceable insert 950. FIG. 9C shows a semi-transparent perspective view of the replaceable insert 950. FIG. 9D shows a cross sectional side view of the replaceable insert 950. Referring to FIGS. 1 through 9D, the replaceable insert 950 of FIGS. 9A through 9D combines the insert body 251 (as well as the alternative insert body 651 and the alternative insert body 751) and the adapter 265 of the replaceable insert 250 discussed above into a single piece.

The replaceable insert 950 (also more simply called an insert 950 herein) can be inserted into and removed from the cavity (e.g., cavity 274) of an enclosure (e.g., enclosure 245). The insert 950 can be formed in any of a number of ways using any of a number of materials. For example, the body 950 can be formed from plastic using a three-dimensional printer. In some cases, one or more parts (e.g., the top surface 952) of the insert 950 can be etched with markings, such as a ruler. When the body 950 is made of plastic, the particular composition of the plastic can be variable and selected in order to simulate proppant embedment and rock properties.

While the insert 950 is a single piece, the insert 950 in this example has two portions (testing portion 920 and funneling portion 930). The testing portion 920 of the insert 950 is substantially equivalent to the insert bodies (e.g., insert body 251) discussed above. Specifically, the testing portion 920 of the insert 950 is configured to facilitate the flow of a fluid during testing. The funneling portion 930 of the insert 950 is substantially equivalent to the adapter 265 discussed above. Specifically, the funneling portion 930 is configured to secure the insert 950 within the cavity (e.g., cavity 274) of the enclosure (e.g., enclosure 240) and funnel the fluid from the testing portion 920 to an outlet port (e.g., outlet port 272) of the enclosure 240.

In this example, the testing portion 920 of the insert 950 has a channel 955 disposed therein, but the insert 950 does not have any protrusions (e.g., protrusions 458), recesses (e.g., recesses 512), or other comparable features because the testing portion 920 and the funneling portion 930 are a single piece. The testing portion 920 of the insert 950 in this case has a single channel 955. The insert 950 has multiple surfaces. Specifically, the insert 950 has a top surface 952 (part of the testing portion 920), a bottom surface 947 (common for the testing portion 920 and the funneling portion 930), a left surface 963 (common for the testing portion 920 and the funneling portion 930), a right surface 961 (common for the testing portion 920 and the funneling portion 930), a front surface 962 (part of the testing portion 920), a rear surface 964 of the testing portion 920, and a rear surface 917 common for a lower part of the testing portion 920 and the funneling portion 930. These surfaces of the insert 950 are substantially smooth and planar in this case.

The top surface 916 of the funneling portion 930, similar to the top surface 516 of the adapter 265 discussed above, is planar but downward sloping from each end, meeting at a curved valley 919 in the middle of the top surface 916. The top surface 916 is symmetrical along a vertical axis when viewed from the rear, as shown in FIG. 9B. The channel 955 disposed within the insert 950 is also defined by a number of surfaces. In this case, the proximal end 956 of the channel 955 forms a cylindrical tube (having a substantially circular cross-sectional shape) having an outer surface 946 that extends upward at a gradual angle relative to the bottom surface 947 for approximately the first sixth of the length of the insert 950 until approaching a transition point 944 toward the top surface 952 of the insert 950. The proximal end 956 of the channel 955 has a counterbore that extends a small distance into the insert 950. In such a case, the counterbore at the proximal end 956 can be used to receive some of the piping (e.g., piping 188) that provides a fluid to the channel 955 of the insert 950.

As with the insert body 251 discussed above, at the transition point 944, the channel 955 becomes a type of elongated open-topped prism that increases in width and decreases in height as the channel 955 reaches the distal end 957. The channel 955 is continuously maintained from the proximal end 956 to the distal end 957. In the open-topped prism part of the single channel 955, the cross-sectional shape can be substantially an open-topped rectangle along its length, having a bottom surface 953, a left surface 948, and a right surface 949. As stated above, the channel 955 in this case is designed to provide a constant flow rate of fluid flowing therethrough between the proximal end 956 and the distal end 957 of the insert 950. For this to occur, the cross-sectional area at every point in the channel 955 along its entire length (e.g., between the proximal end 956 and the distal end 957) is substantially the same.

When the enclosure cover (e.g., enclosure cover 241) is coupled to the enclosure body (e.g., enclosure body 270) with the insert 950 disposed in the cavity (e.g., cavity 274) of the resulting enclosure (e.g., enclosure 245), the bottom surface of the body (e.g., body 243) of the enclosure cover 241 off the top part of the channel 955 (at least between the transition point 944 and the distal end 957), where the top surface 952 of the insert 950 is absent. Also, where the top surface 952 of the insert 950 is present, the top surface 952 abuts against the bottom surface of the body of the enclosure cover when the enclosure cover is coupled to the enclosure body and the insert 950 is disposed in the cavity of the enclosure.

In this case, the center along the length of the channel 955 is coincident with the center of the insert 950 along the length of the insert 950. For example, the center of the proximal end 956 of the channel 955 is positioned in substantially the center (both in terms of height and width) of the front surface 962 of the insert 950. As another example, the center of the distal end 957 of the channel 955 is coincident with the center (along the width but not the height) of the insert 950.

The channel 955 of the insert 950 is configured to allow a fluid flow therethrough. The channel 955 runs continuously along the length of the insert 950. The channel 955 of the insert 950 can be configured to allow one or more fluids being tested to pass therethrough in a controlled manner. For example, as in this case, the channel 955 of the insert 950 is configured to allow a fluid being tested to pass therethrough at a substantially constant flow rate. In such a case, the channel 955 can be configured to simulate a condition, such as the narrow end of a fracture in a subterranean formation adjacent to a wellbore, when a fluid flows therethrough during a test.

To help secure the insert 950 within the cavity (e.g., cavity 274) of the enclosure (e.g., enclosure 245), the insert 950 can include one or more coupling features that are configured to directly or indirectly couple to corresponding coupling features (e.g., coupling features 263) of the enclosure. In this case, similar to the configuration of the coupling features 511 of the adapter 265 discussed above, the insert 950 includes two coupling features 911 (coupling feature 911-1 and coupling feature 911-2), each in the form of an aperture that traverses the height of the funneling portion 930 of the insert 950. Each coupling feature 911 includes a counterbore at the top surface 916.

Specifically, coupling feature 911-1 includes an aperture that traverses the height of the left side of the funneling portion 930 and a counterbore at the top surface 916 that extends about three quarters into the height of the funneling portion 930 at the point of entry. Similarly, coupling feature 911-2 includes an aperture that traverses the height of the left side of the funneling portion 930 and a counterbore at the top surface 916 that extends about three quarters into the height of the funneling portion 930 at the point of entry. In this case, the configuration of the coupling features 911 and their distance from the curved valley 919 in the top surface 916 in the funneling portion 930 of the insert 950 are identical to each other. Each coupling feature 911 is configured to complement a coupling feature (e.g., coupling feature 263) of the enclosure body (e.g., enclosure body 270).

When the coupling feature 911-1 aligns with the corresponding coupling feature of the enclosure, an independent coupling feature (e.g., coupling feature 235-1, in the form of a screw or a bolt) can be inserted (e.g., threadably) into the coupling feature 911-1 and the corresponding coupling feature of the enclosure to secure the insert 950 to the enclosure body. Similarly, when the coupling feature 911-2 aligns with the corresponding coupling feature of the enclosure, another independent coupling feature (e.g., coupling feature 235-2 in the form of a screw or a bolt) can be inserted (e.g., threadably) into the coupling feature 911-2 and the corresponding coupling feature of the enclosure to secure the insert 950 to the enclosure body 270. The counterbore of each coupling feature 911 keep the independent coupling feature disposed therein from protruding above the plane defined by the top surface 916 of the funneling portion 930 of the insert 950.

The configuration of the top surface 916 of the funneling portion 930 of the insert 950, as described above and shown in FIG. 9B, is designed to funnel the fluid that has reached the distal end 957 of the channel 955 of the insert 950 into the outlet port (e.g., outlet port 272) of the enclosure body (e.g., enclosure body 270). In this way, the configuration of the top surface 916 depends on multiple factors, including but not limited to the location of the beginning of the outlet port of the enclosure body relative to the distal end 957 of the channel 955, the width of the channel 955 at the distal end 957, and the flow rate of the fluid through the channel 955. In some cases, the top surface 916 of the insert 950 can be considered part of the channel 955. In such a case, the distal end 957 represents the distal end of the testing portion 920 and not the distal end of the channel 955.

Example embodiments can be used for testing a fluid under controlled conditions within a diverter test cell. Example embodiments have at least one channel with a varying width and height, but a substantially constant cross-sectional area along the length of the channel, that allows the fluid to flow along its length at a substantially constant flow rate. The configuration of the channel can be designed to simulate a subterranean condition, such as a fracture that extends from a wellbore. Example embodiments can be configured to be insertable and removable with respect to the cavity of a diverter test cell. Example embodiments can be formed by a number of different processes, such as three-dimensional printing. Example embodiments can include a single piece or multiple pieces. Example embodiments can include markings (e.g., a ruler) that can help a user interpret test results, whether during or after testing. Example embodiments can be used with a diverter test cell that has a viewing window to allow for observation of a fluid flowing through a channel of the insert during testing. The configuration of a channel disposed on an example insert can be specifically designed for a particular test phase. Example embodiments can provide a number of benefits. Such other benefits can include, but are not limited to, ease of use, ease of manufacturing, flexibility, configurability, time savings, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A diverter test cell comprising:
an enclosure comprising a body and a cover removably coupled to the body, wherein the body forms a cavity that is enclosed by the cover when the cover is coupled to the body, wherein the body comprises an inlet port and an outlet port in communication with the cavity, and wherein the inlet port and the outlet port are disposed on opposite sides of the body; and an insert removably disposed within the cavity, wherein the insert has a channel that forms continuously from a first end to a second end of the insert, wherein the channel has a first height and a first width at the first end and a second height and a second width at the second end, wherein the first width is less than the second width, wherein the first end of the insert is adjacent to the inlet port of the enclosure, and wherein the second end of the insert is adjacent to the outlet port of the enclosure.

2. The diverter test cell of claim 1, wherein the first height is greater than the second height.

3. The diverter test cell of claim 1, wherein the inlet port is configured to receive a fluid, and wherein the fluid flows at a substantially constant flow rate through the channel of the insert between the inlet port and the outlet port.

4. The diverter test cell of claim 3, wherein the fluid comprises a proppant.

5. The diverter test cell of claim 1, wherein the enclosure and the insert are configured to be subjected to a range of temperatures.

6. The diverter test cell of claim 1, wherein the enclosure and the insert are configured to be subjected to a range of pressures.

7. The diverter test cell of claim 1, further comprising:
a plurality of coupling features that couple the cover and the body of the enclosure to each other.

8. The diverter test cell of claim 1, wherein the plurality of coupling features comprises a plurality of bolts.

9. The diverter test cell of claim 1, wherein the cover is see-through.

10. The diverter test cell of claim 1, further comprising:
a second insert disposed within the cavity at a time after the insert is removed from the cavity, wherein the second insert has a channel that forms continuously from a first end to a second end of the second insert, wherein the channel has a first height and a first width at the first end and a second height and a second width at the second end, and wherein the second width of the second insert is less than the second width of the insert.

11. The diverter test cell of claim 1, wherein the insert comprises an insert body and an adapter engaged with each other within the cavity, wherein the adapter is located proximate to the outlet port, and wherein the adapter is configured to be coupled to the body of the enclosure.

12. The diverter test cell of claim 11, wherein the adapter is further configured to funnel fluid flowing through the channel on the insert body to the outlet port of the body of the enclosure.

13. The diverter test cell of claim 1, wherein the channel at the second end of the insert is configured to funnel fluid flowing through the channel to the outlet port of the body of the enclosure.

14. A system for diverter testing comprising:
a source apparatus comprising a storage vessel, a pumping system, and an outlet;
piping coupled to the outlet of the source apparatus; and
a diverter test cell coupled to one of the plurality of pipes, wherein the diverter test cell comprises:
an enclosure comprising a body and a cover removably coupled to the body, wherein the body forms a cavity that is enclosed by the cover when the cover is coupled to the body, wherein the body comprises an inlet port and an outlet port in communication with the cavity, wherein the inlet port and the outlet port are disposed on opposite sides of the body, and wherein the inlet port is coupled to the piping; and an insert movably disposed within the cavity, wherein the insert has a channel that forms continuously from a first end to a second end of the insert, wherein the channel has a first height and a first width at the first end and a second height and a second width at the second end, wherein the first height is greater than the second height, wherein the first end of the insert is adjacent to the inlet port of the enclosure, and wherein the second end of the insert is adjacent to the outlet port of the enclosure, wherein the pumping system is configured to force a fluid to flow from the storage vessel, through the outlet, through the piping, through the inlet port, through the channel, and through the outlet port, wherein the fluid flows at a substantially constant flow rate through the channel of the insert.

15. The system of claim 14, further comprising:
additional piping coupled to a second outlet of the source apparatus; and
an additional diverter test cell coupled to the additional piping, wherein the additional diverter test cell comprises:
an additional enclosure comprising an additional body and an additional cover removably coupled to the additional body, wherein the additional body forms an additional cavity that is enclosed by the additional cover when the additional cover is coupled to the additional body, wherein the additional body comprises an additional inlet port and an additional outlet port in communication with the additional cavity, wherein the additional inlet port and the additional outlet port are disposed on opposite sides of the additional body, and wherein the additional inlet port is coupled to the additional piping; and
an additional insert movably disposed within the additional cavity, wherein the additional insert has an additional channel that forms continuously from a first end to a second end of the additional insert, wherein the additional channel has a third height and a third width at the first end of the additional insert and a forth height and a forth width at the second end of the additional insert, wherein the third width is less than the forth width, wherein the first end of the additional insert is adjacent to the additional inlet port of the additional enclosure, and wherein the second end of the additional insert is adjacent to the additional outlet port of the additional enclosure.

16. The system of claim 14, further comprising:
a flow control device disposed within the piping, wherein the flow control device has a first position and a second position, wherein the flow control device, when in the first position, is configured to allow the fluid to flow to the diverter test cell, and wherein the flow control device, when in the second position, allows the fluid to bypass the diverter test cell.

17. An insert for a diverter test cell, wherein the insert comprises:
a body having a first end and a second end;
a channel continuously disposed within the body from the first end to the second end, wherein the channel has a height and a width that varies between the first end and the second end, wherein the width and the height forms a cross-sectional area that is substantially constant between the first end and the second end, wherein the first end is configured to be disposed adjacent to an inlet port of an enclosure of the diverter test cell, wherein the second end is configured to be disposed adjacent to an outlet port of the enclosure of the diverter test cell, and wherein the channel is configured to receive fluid that flows from the first end to the seco nd end.

18. The insert of claim 17, wherein the second end of the body further comprises a funneling contour that is configured to funnel the fluid in the channel approaching the second end.

19. The insert of claim 17, wherein the second end of the body further comprises a coupling feature that is configured to couple to a complementary coupling feature of the enclosure of the diverter test cell.

20. The insert of claim 17, further comprising:
a sensor device disposed within the body adjacent to the channel, wherein the sensor device is configured to measure a parameter associated with the fluid flowing through the channel.

\* \* \* \* \*